(12) United States Patent
Mondal et al.

(10) Patent No.: US 11,063,726 B2
(45) Date of Patent: Jul. 13, 2021

(54) DOWNLINK CONTROL CHANNEL DESIGN FOR BEAMFORMING SYSTEMS

(71) Applicant: Apple Inc., Cupertino, CA (US)

(72) Inventors: Bishwarup Mondal, San Ramon, CA (US); Ajit Nimbalker, Fremont, CA (US); Gang Xiong, Portland, OR (US); Peng Lu, Sunnyvale, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/326,168

(22) PCT Filed: Sep. 14, 2017

(86) PCT No.: PCT/US2017/051609
§ 371 (c)(1),
(2) Date: Feb. 15, 2019

(87) PCT Pub. No.: WO2018/053160
PCT Pub. Date: Mar. 22, 2018

(65) Prior Publication Data
US 2019/0182009 A1 Jun. 13, 2019

Related U.S. Application Data

(60) Provisional application No. 62/395,281, filed on Sep. 15, 2016.

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0617* (2013.01); *H04L 1/0057* (2013.01);
(Continued)

(58) Field of Classification Search
CPC ... H04L 5/0048; H04L 5/0053; H04L 5/0051; H04L 5/0094; H04W 72/042
See application file for complete search history.

(56) References Cited

U.S. PATENT DOCUMENTS

2010/0312894 A1* 12/2010 Awad .................. H04W 72/042
709/226
2014/0233481 A1* 8/2014 Feng .................... H04L 5/0053
370/329

(Continued)

OTHER PUBLICATIONS

International Preliminary Report on Patentability for PCT Application No. PCT/US17/51609, dated Mar. 28, 2019.
(Continued)

*Primary Examiner* — Jung H Park
(74) *Attorney, Agent, or Firm* — Sterne, Kessler, Goldstein & Fox P.L.L.C.

(57) ABSTRACT

Described is an apparatus of a first User Equipment (UE) operable to communicate with on a wireless network. The apparatus may comprise a first circuitry, and a second circuitry. The first circuitry may be operable to establish a parameter set defining 5G Physical Downlink Control Channel (xPDCCH) transmission to the UE. The second circuitry may be operable to generate, for transmission to the UE, one or more messages including the parameter set.

17 Claims, 20 Drawing Sheets

(51) Int. Cl.
*H04L 1/00* (2006.01)
*H04L 1/06* (2006.01)
*H04W 72/04* (2009.01)
*H04W 72/12* (2009.01)

(52) U.S. Cl.
CPC ............ *H04L 1/0606* (2013.01); *H04L 5/003* (2013.01); *H04L 5/005* (2013.01); *H04L 5/0046* (2013.01); *H04L 5/0053* (2013.01); *H04L 5/0094* (2013.01); *H04W 72/0446* (2013.01); *H04W 72/1289* (2013.01); *H04L 5/0023* (2013.01)

(56) References Cited

U.S. PATENT DOCUMENTS

| | | | | |
|---|---|---|---|---|
| 2017/0332359 | A1* | 11/2017 | Tsai | H04B 7/0639 |
| 2018/0192406 | A1* | 7/2018 | Tang | H04W 72/0453 |
| 2019/0174525 | A1* | 6/2019 | Kwak | H04W 72/1268 |
| 2019/0200347 | A1* | 6/2019 | Ryu | H04W 72/0413 |

OTHER PUBLICATIONS

International Search Report and Written Opinion for International Patent Application No. PCT/US17/51609, dated Nov. 16, 2017.
Verizon; "Verizon 5G TF; Air Interface Working Group; Verizon 5th Generation Radio Access; Physical channels and modulation (Release 1)", Jun. 29, 2016.
Ericsson, "Demodulation reference signal design principles", 3GPP Draft; R1-167037, 3rd Generation Partnership Project (3GPP), vol. RAN WG1, Gothenburg, Sweden, Aug. 12, 2016.
Interdigital Communications, "Considerations on reference signal design for NR", 3GPP Draft; R1-167573 Reference Signal Design for NR, 3rd Generation Partnership Project (3GPP), vol. RAN WG1, Gothenburg, Sweden, Aug. 21, 2016; Retrieved from the Internet on Aug. 21, 2016 via www.3gpp.org.
Verizon, "Verizon 5G TF; Air Interface Working Group; Verizon 5th Generation Radio Access; Physical layer procedures (Release 1)", Jun. 1, 2016, pp. 1-43; Retrieved from the Internet on Nov. 7, 2016 via www.5gtf.org.

* cited by examiner

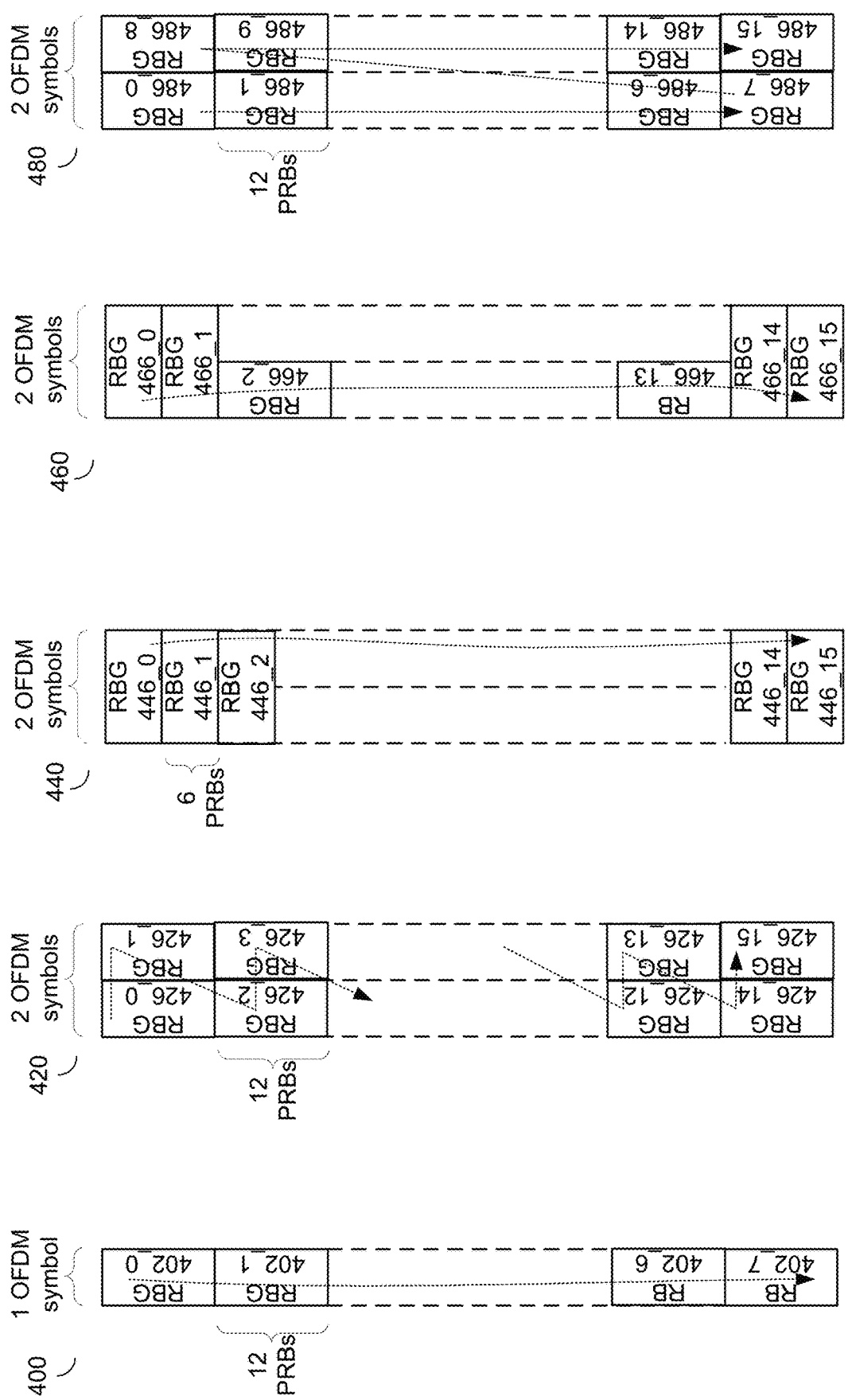

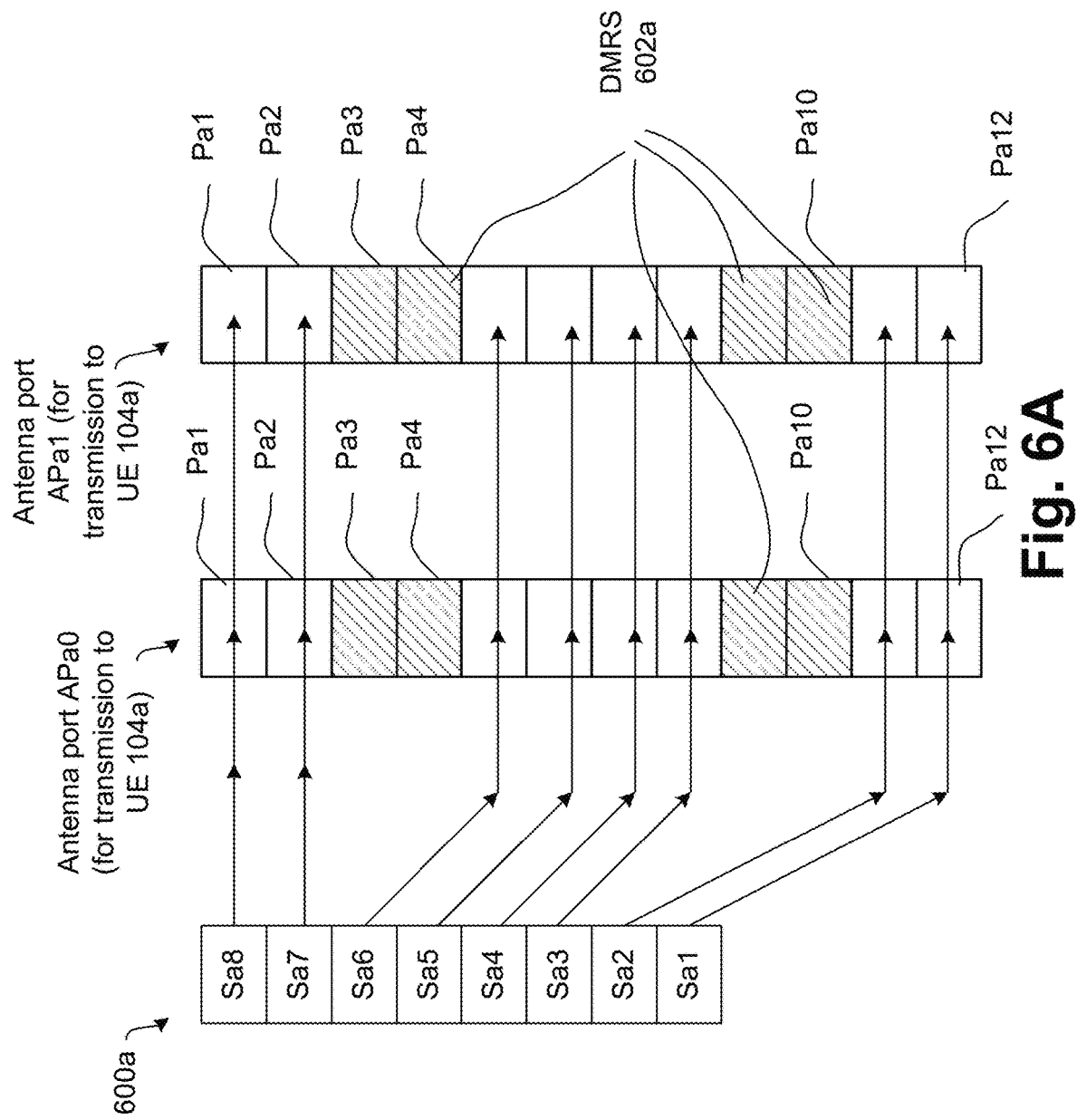

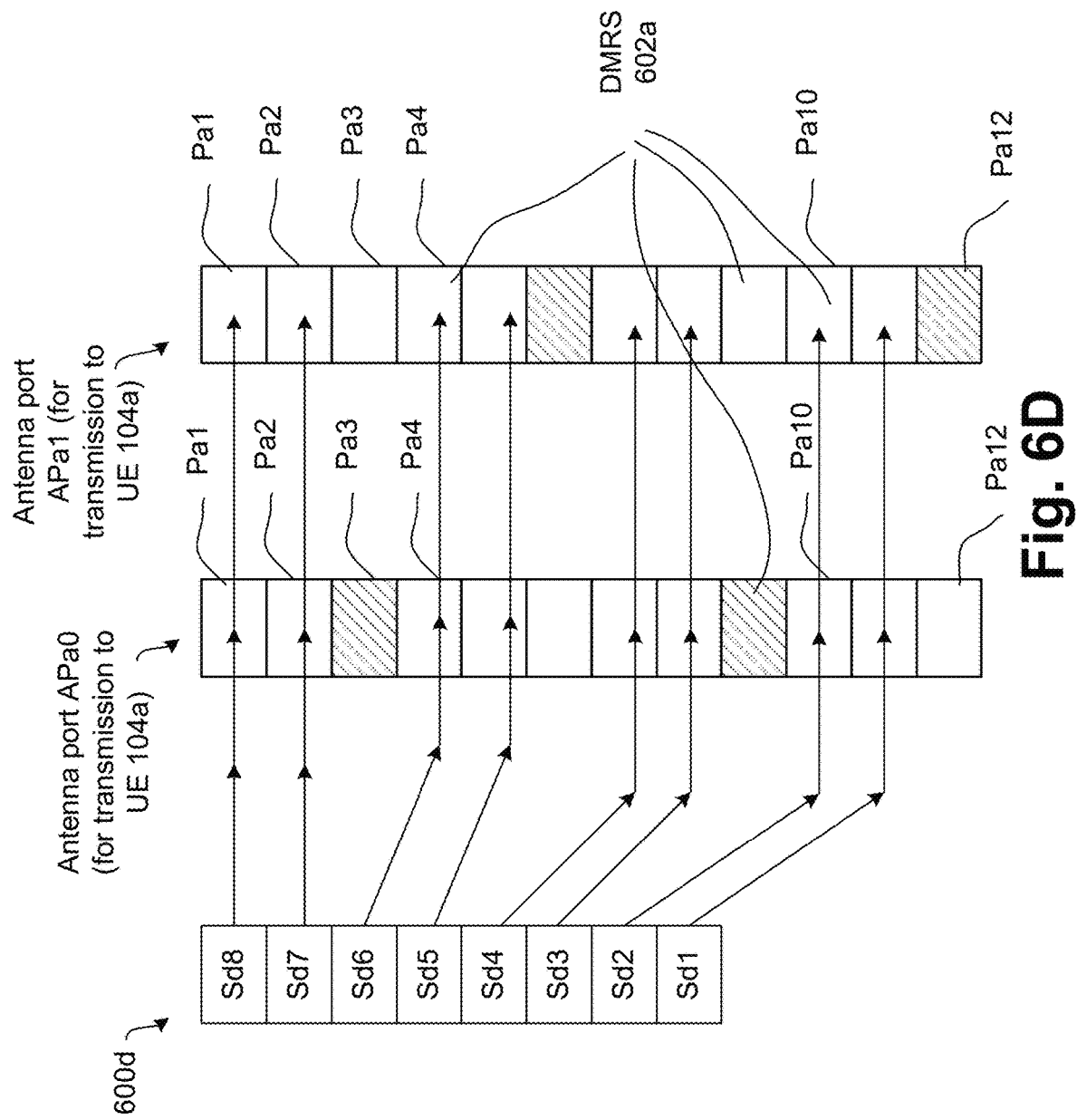

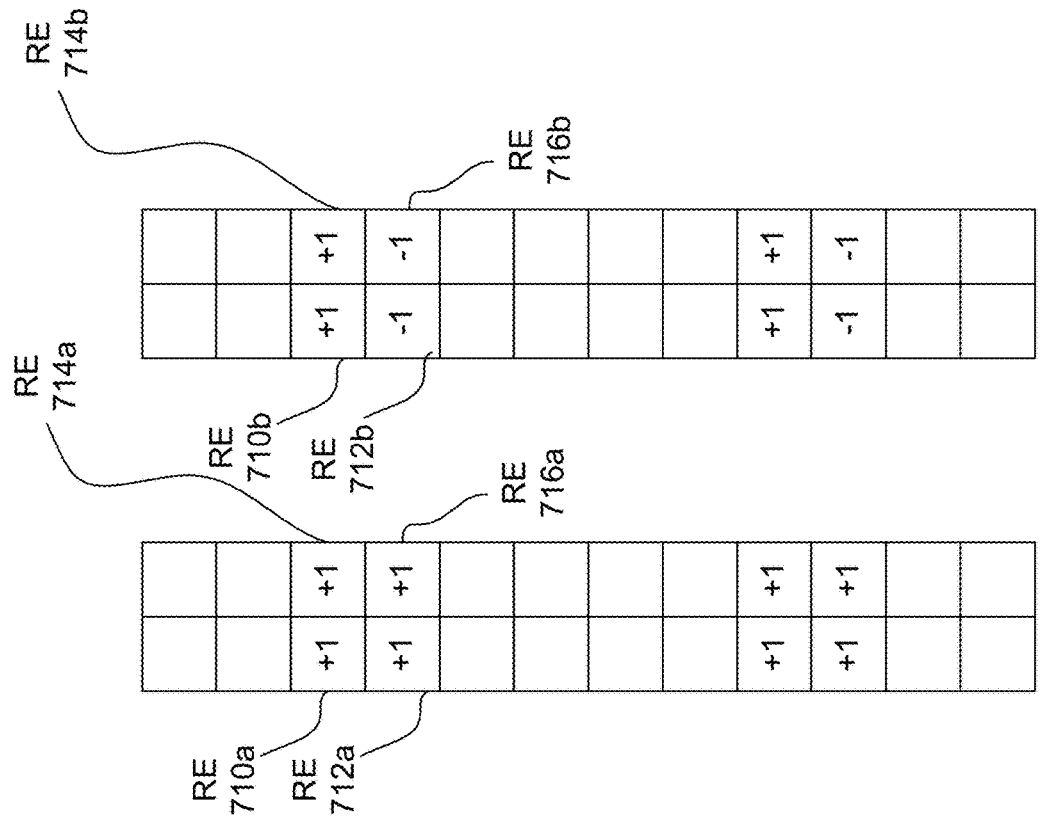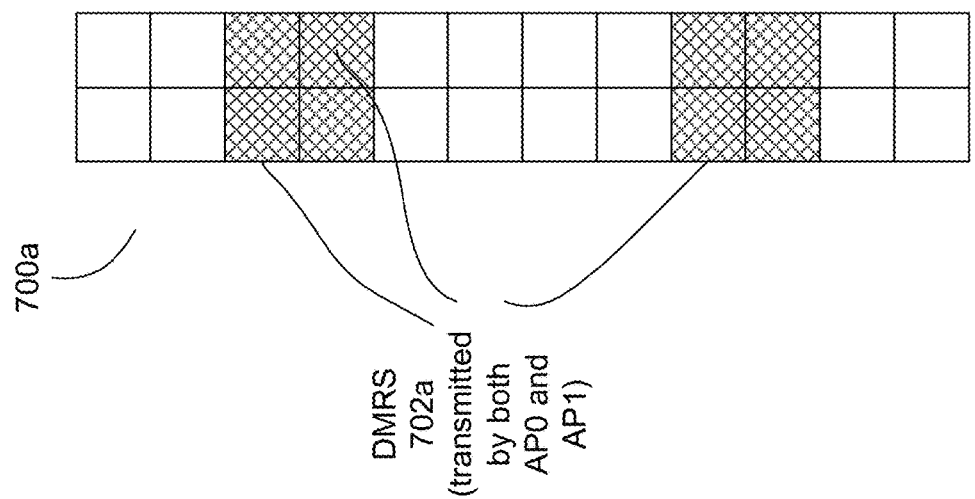
Fig. 7A

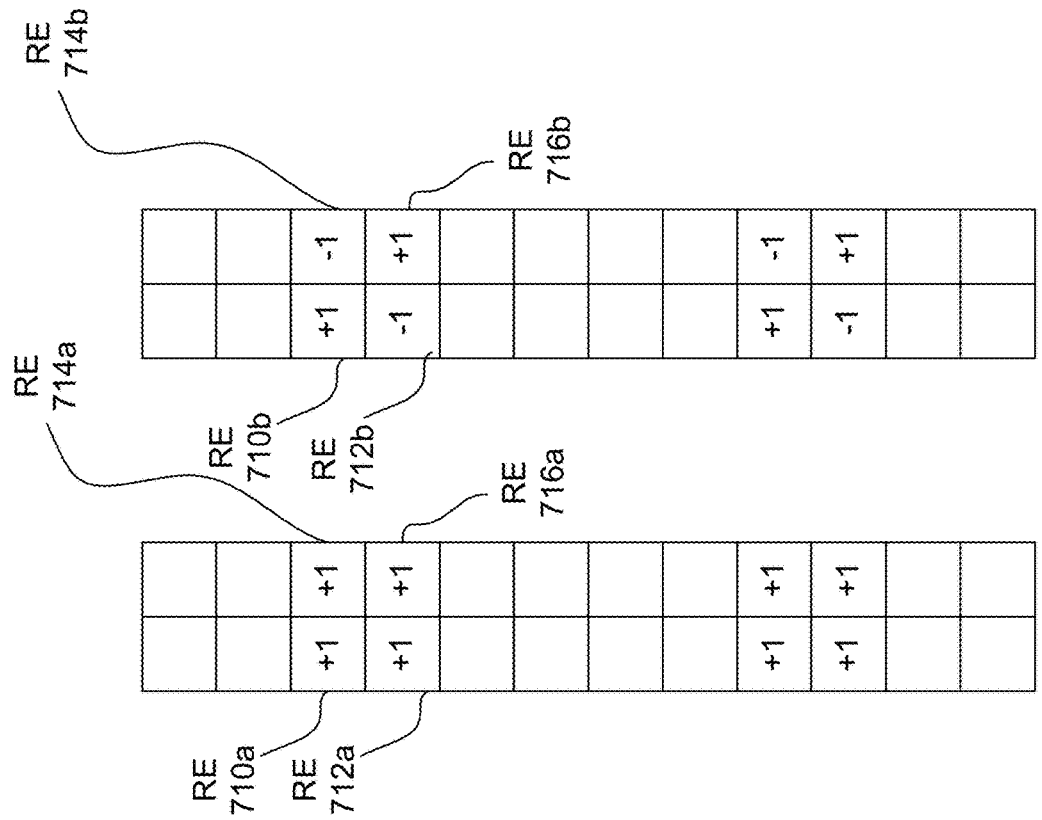
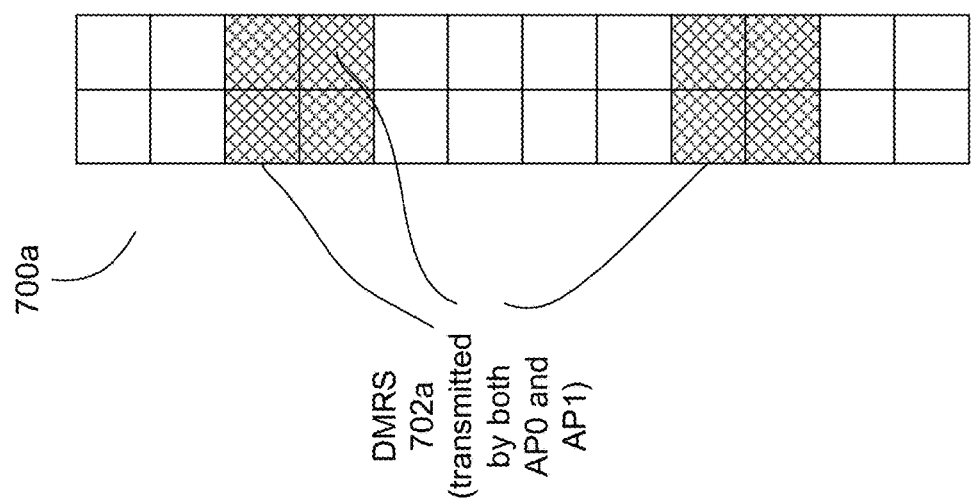
Fig. 7B

DOWNLINK CONTROL CHANNEL DESIGN FOR BEAMFORMING SYSTEMS

CLAIM OF PRIORITY

The present application is a National Stage Entry of, and claims priority to PCT Application Serial Number PCT/US2017/051609, filed Sep. 14, 2017, and titled "DOWNLINK CONTROL CHANNEL DESIGN FOR BEAMFORMING SYSTEMS", which claims priority under 35 U.S.C. § 119(e) to U.S. Provisional Patent Application Ser. No. 62/395,281, filed Sep. 15, 2016 and entitled "DOWNLINK CONTROL CHANNEL FOR BEAMFORMING SYSTEMS," both of which are herein incorporated by reference in their entireties.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system. Next-generation wireless cellular communication systems may provide support for higher bandwidths in part by supporting higher carrier frequencies, such as centimeter-wave and millimeter-wave frequencies.

A Physical Downlink Control Channel (PDCCH) in a wireless cellular communication system may carry scheduling assignments, Downlink Control Information (DCI), and/or and other control information. It may be useful to design a downlink control channel (e.g., comprising Demodulation Reference Signals (DMRS)) that may be able to take advantage of the time correlation, e.g., when the control channel spans over multiple symbols.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIGS. 4A-4E illustrate example manners of logical to physical mapping of a set of RBGs, according to some embodiments.

FIG. 6A illustrate an example mapping of DMRS and control data to multiple antenna ports, according to some embodiments.

FIG. 6D-6F illustrate example mappings of DMRS and control data to corresponding antenna port(s), in which the DMRSs are transmitted over non-adjacent REs, according to some embodiments.

FIGS. 7A-7D illustrate example mapping of DMRS or OCC to multiple antenna ports, according to some embodiments.

DETAILED DESCRIPTION

Figure 1:
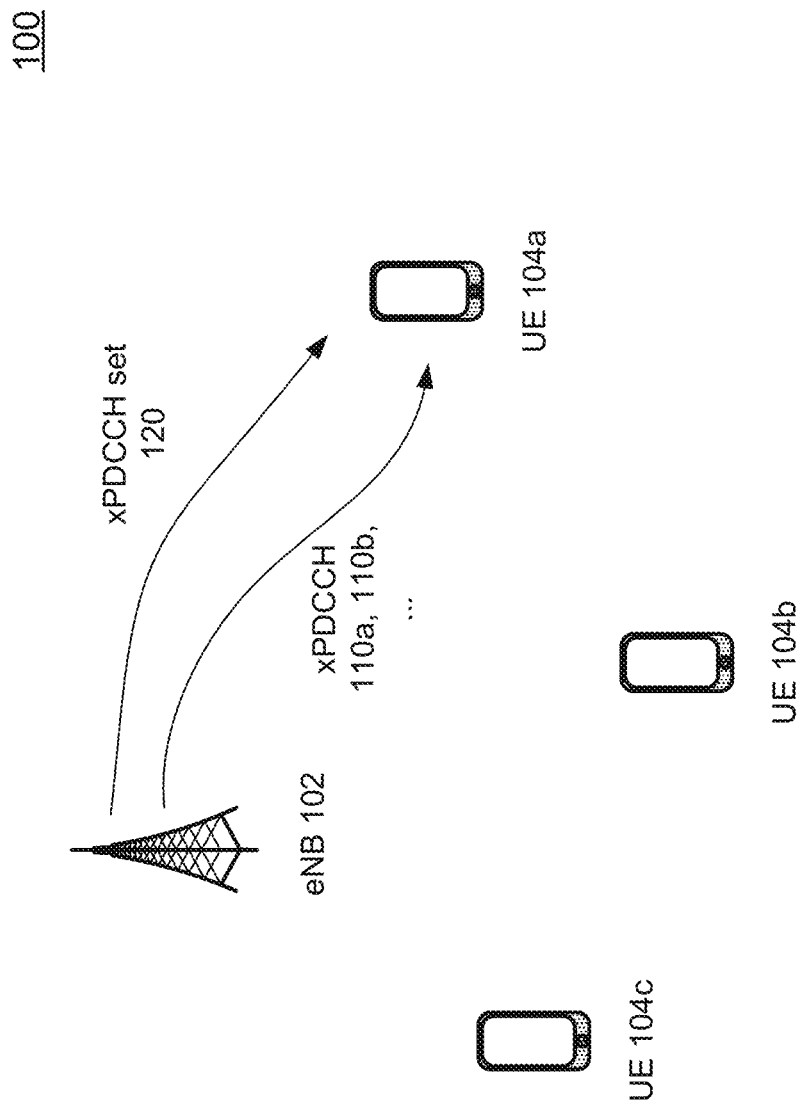
FIG. 1 illustrates a communication system for configuring a 5G PDCCH (xPDCCH) set corresponding to a physical downlink control channel, according to some embodiments.

In the LTE Technical Specification release 8, PDCCH design may be as follows. Channel estimation may be based on wideband cell specific common reference signals, e.g., resulting in robust channel estimation performance. However, wideband common reference signals may create interference in dense deployments, even with little or no load, and may not be compatible with UE specific beamforming.

In the LTE Technical Specification release 11, enhanced PDCCH (ePDCCH) design may be as follows. Channel estimation may be based on DMRS. The channel estimation boundary or block size may be fixed to one Physical Resource Block (PRB), which may be formed by 12 subcarriers×14 symbols. This may allow interference coordination in dense deployments, and may be compatible with UE specific beamforming. However, in this design, a 14 symbol delay may result for decoding xPDSCH allocated in a same subframe.

In the 5G SIG Specification, xPDCCH design may be as follows. Channel estimation may be based on DMRS. The channel estimation boundary or block size may be fixed to 72 subcarriers×1 symbol. However, in such a design of the xPDCCH, the channel estimation block may not take advantage of time correlation, when xPDCCH spans multiple symbols. Also, the frequency domain footprint of the xPDCCH may be large, which may limit an ability to do interference coordination in dense deployments.

Accordingly, it may be useful to design a new control channel, e.g., based on dedicated DMRS, that my take advantage of the time correlation, when the control channel spans multiple symbols.

As discussed herein in further details, various embodiments of this disclosure discuss a design of control channel, e.g., an enhanced xPDCCH. In some embodiments, the enhanced xPDCCH may allow optimization of DMRS and/or channel estimation, e.g., depending on a configurable physical footprint of a control channel (e.g. if a DCI allocation spans across symbols in time, DMRS may take advantage of time-correlation). In some embodiments, the xPDCCH may allow a common structure for one port beamforming, two port Space Frequency Block Code (SFBC), and/or the like.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy eNB, a next-generation or NR gNB, a 5G eNB, an Access Point (AP), a Base Station or an eNB communicating on the unlicensed spectrum, and/or another base station for a wireless communication system. For purposes of the present disclosure, the term "UE" may refer to a legacy UE, a next-generation or NR UE, a 5G UE, an STA, and/or another mobile equipment for a wireless communication system.

Various embodiments of eNBs and/or UEs discussed below may process one or more transmissions of various types. Some processing of a transmission may comprise receiving, conducting, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise receiving, conducting, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

FIG. 1 illustrates a communication system 100 for configuring an xPDCCH set 120 corresponding to a physical downlink control channel, according to some embodiments. The system 100 may comprise an eNB 102 and three example UEs 104a, 104b, and 104c (collectively and generally referred to as UE 104, or UEs 104). Although the system 100 is likely to include various other components (e.g., one or more other eNBs, one or more other UEs, and/or other network components), such components are not illustrated in FIG. 1 for purposes of illustrative clarity. Furthermore, transmission of signals from the eNB 102 to only the UE 104a is illustrated in FIG. 1.

In some embodiments, the eNB 102 may transmit xPDCCH 110a, 110b, and so on (e.g., a series of sequence of xPDCCHs) to the UE 104a, where the xPDCCH 110a, 110b, and so on are referred to generally as xPDCCH 110 or xPDCCHs 110. Although FIG. 1 illustrates transmission of xPDCCH 110, any other appropriate format of PDCCH (e.g., ePDCCH, PDCCH, or another format of PDCCH) may also be transmitted.

In some embodiments, the eNB 102 may also transmit a xPDCCH set 120 (henceforth also referred to as "set 120") to the UE 104a. In some embodiments, individual parameters of the set 120 may be broadcast by the eNB 102 (e.g., to the UEs 104, including the UE 104a), transmitted using unicast specifically to the UE 104a via higher layer signaling (e.g., via Radio Resource Control (RRC) messages), and/or the like.

In some embodiments, the set 120 may comprise one or more parameters, which the UE 104a may use to receive and/or demodulate a physical control channel, e.g., the xPDCCHs 110. For example, the set 120 may comprise parameters that may specify the configuration of the xPDCCH 110, location of the xPDCCH 110 in a subframe, and/or may include other relevant information about the xPDCCH 110, as discussed in further details herein later.

In some embodiments, the set 120 may comprise one or more of the following:

(i) one or more defining a resource allocation set, which may be defined by a set of resource blocks, where individual resource blocks may be represented by $N_{RAS}$ consecutive symbols, $M_{RAS}$ consecutive Physical Resource Blocks (PRBs), and a bitmap of length $\lfloor BW/M_{RAS} \rfloor$). Resource allocation set is discussed in further details herein below.

(ii) one or more parameters defining Resource Block Groups (RBGs) comprising by N OFDM symbols and M PRBs. In some embodiments, the physical Resource Elements (REs) associated with a RBG may be contiguous, and may define a granularity of channel estimation from the UE side and beamforming from the eNB side. For a given UE (e.g., UE 104a), a RBG may be mapped to a physical resource contained within its resource allocation set. RBG is discussed in further details herein below.

(iii) one or more parameters defining a logical to physical resource mapping for a set of RBGs (e.g. time first, or frequency first, as discussed in further details herein below).

(iv) one or more parameters indicating a xCCE (5G Control Channel Element) to RBG mapping type (e.g. localized or distributed). An xCCE may define a granularity of control channel data.

(v) one or more parameters indicating one or more types of search space (e.g., Common Search Space (CSS), or UE specific Search Space (UESS). For example, the one or more parameters may indicate one of: (a) CSS or UESS, (b) UESS, or (c) CSS and UESS.

(vi) one or more parameters indicating a DMRS and antenna port mapping—e.g. SFBC (port 0 and port 1, e.g., employing multiple antenna ports), beamforming (port 0 or port 1, e.g., employing one antenna port), etc.

(vii) one or more scrambling ID.

(viii) a set index.

(ix) a set of downlink control information payloads to detect in the xPDCCH.

(x) a transmission scheme identifier.

In addition to the parameters discussed herein, the set 120 may include one or more other parameters associated with xPDCCHs 110.

In some embodiments, a UE (e.g., the UE 104a) may be configured to monitor one or more xPDCCH sets (e.g., the set 120, and possibly other xPDCCH sets). In an example, the parameters for the set 120, which may be of CSS, may be conveyed to the UE 104a from the eNB 102 through higher layer signaling (e.g. broadcast information), specified in a specification, and/or may be preconfigured. In some embodiments, the parameters for the set 120, which may be of type UESS, may be configured through higher layer signaling (e.g. broadcast and/or unicast), specified in a specification, and/or may be preconfigured. Thus, in an example, the parameters for the set 120, which may be of type UESS, may be configured through higher layer signaling, such as unicast to the UE 104a.

In some embodiments, for at least one allowable xPDCCH set 120, (12*N*M) may be a number of contiguous REs that may be associated with a RBG, where N may be the number of OFDM symbols in time domain, M may be the number of PRBs in frequency domain, and 12 may be the number of subcarriers per PRB per OFDM symbol. In some embodiments, the number (12*N*M) may be fixed to, for example, 72.

As an example, assume two xPDCCH sets 120a and 120b are transmitted (although not illustrated in FIG. 1) corresponding to two types of xPDCCH. As an example, an RBG associated with xPDCCH set 120a may be defined by N=1, M=6, while an RBG associated with xPDCCH set 120b may be defined by N=2, M=3. Thus, in both the sets 120a and 120b, the number (12*N*M) equates to 72. In some embodiments, multiple xPDCCH sets (e.g., xPDCCH sets 120a and 120b) may co-exist from a system point of view. In some embodiments, a single xPDCCH set 120 may provide indication of multiple types of RBGs in a subframe of an xPDCCH.

Figure 2B:
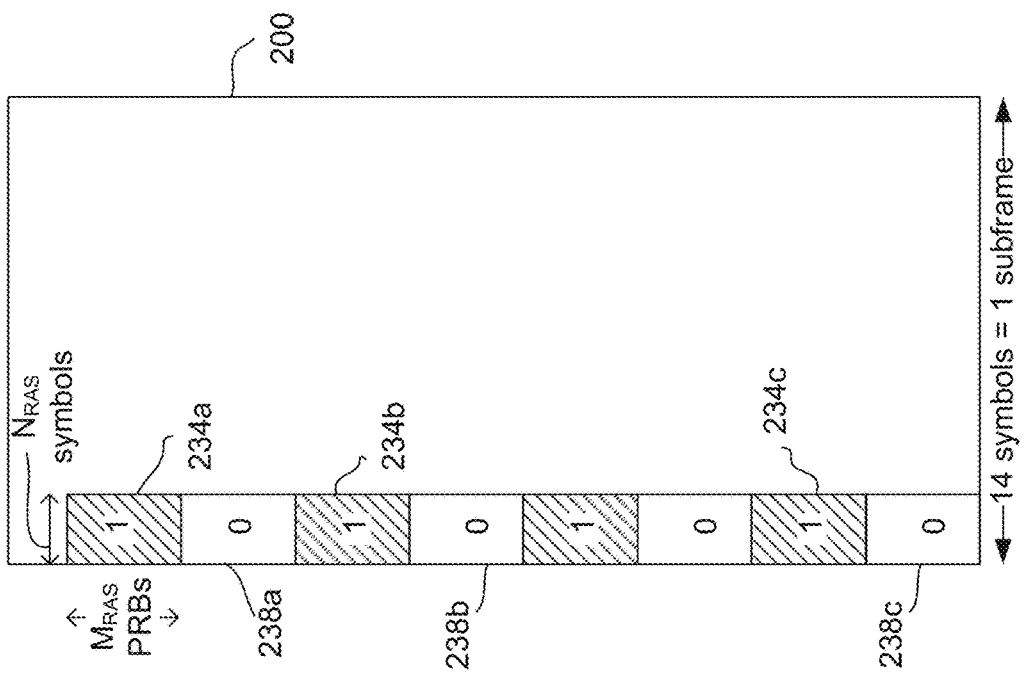
FIG. 2B illustrates a resource allocation set representing locations of resource blocks associated with xPDCCHs in the subframe of FIG. 2A, according to some embodiments.
Figure 2A:
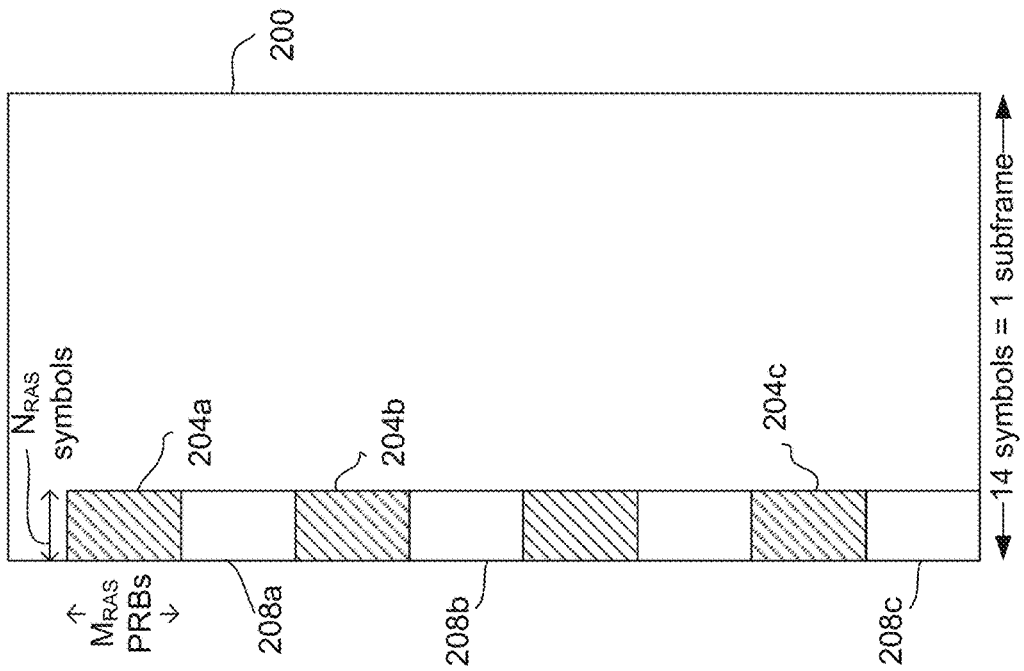
FIG. 2A illustrates a subframe representing locations of resource blocks associated with xPDCCHs in a subframe, according to some embodiments.

FIG. 2A illustrates a subframe representing locations of resource blocks 204a, . . . , 204c associated with xPDCCHs in a subframe 200, according to some embodiments. For example, in the subframe 200, the shaded blocks 204 may represent locations of resource blocks for xPDCCHs that may be intended for the UE 104a, and the non-shaded blocks 208a, . . . , 208c may represent resource blocks that do not represent xPDCCHs for the UE 104a.

In some embodiments, a resource allocation set may be in units of resource blocks (e.g., resource blocks 204). Individual resource block may be represented by $N_{RAS}$ consecutive symbols, $M_{RAS}$ consecutive PRBs, and a bitmap of length $\lfloor BW/M_{RAS} \rfloor$. For example, the entire frequency band may be divided into $\lfloor BW/M_{RAS} \rfloor$ consecutive resource blocks, e.g., with possibly some leftover PRBs at the band edges, where BW may be the system bandwidth or a configurable parameter (e.g., indicated by higher layer signaling).

FIG. 2B illustrates a resource allocation set representing locations of resource blocks 204a, . . . , 204c associated with xPDCCHs in the subframe 200 of FIG. 2A, according to some embodiments. For example, an xPDCCH resource allocation set (e.g., the resource allocation set of FIG. 2B) may be described by $N_{RAS}$, $M_{RAS}$ and a bitmap of length $\lfloor BW/M_{RAS} \rfloor$ indicating the xPDCCH resource blocks with a 1 and 0. For example, the 1's in the resource allocation set (e.g., indicated by shaded blocks 234a, . . . , 234c) of FIG.

2B corresponds to the resource blocks 204a, ..., 204c of FIG. 2A, and the 0's in the resource allocation set (e.g., indicated by non-shaded blocks 238a, ..., 238c) of FIG. 2B corresponds to the resource blocks 208a, ..., 208c of FIG. 2A. Thus, in an example, the 1's and 0's of the resource allocation set is the bitmap that informs the UE 104a of possible location of resource blocks comprising the xPDCCH 110. In some embodiments, to enable early decoding of the xPDCCH, $N_{RAS}$ may denote the first NRAS symbols in a subframe.

Figure 3B:
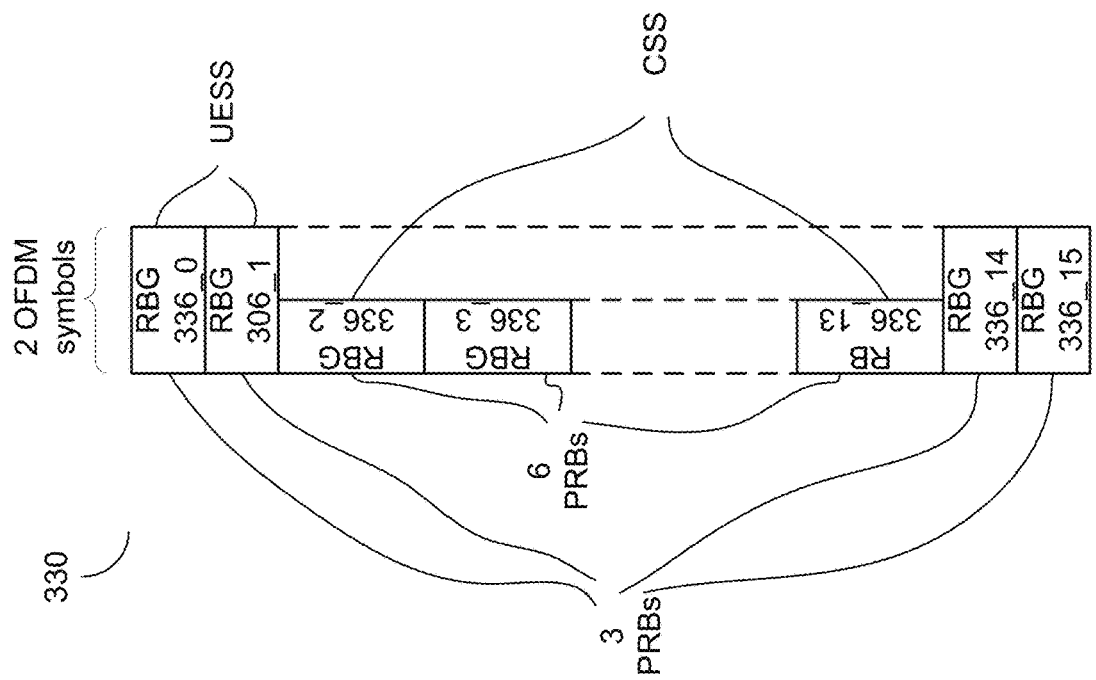
FIGS. 3A and 3B illustrate example configurations of Resource Block Groups (RBGs), according to some embodiments.
Figure 3A:
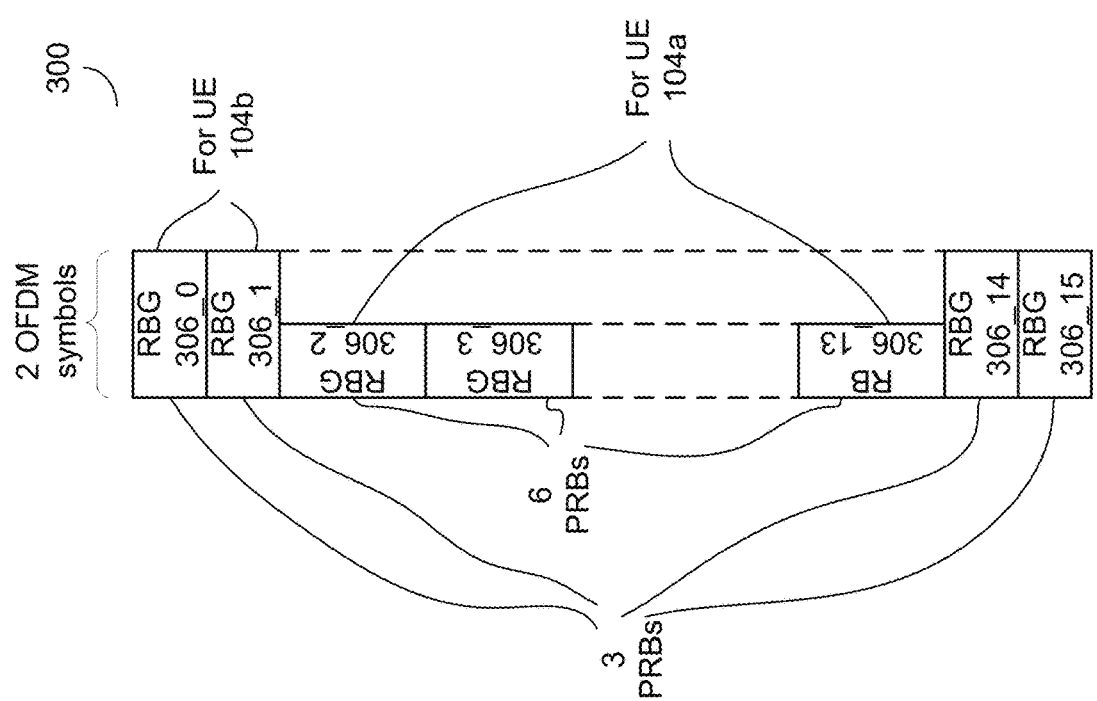

FIGS. 3A and 3B illustrate example configurations 300 and 330, respectively, of RBGs, according to some embodiments. In some embodiments, a RBG may span M physical resource blocks or PRBs in frequency, and N OFDM symbols in time. The physical resource elements (REs) associated with a RBG may be contiguous. A total number of REs associated with a RBG may be fixed or constant across different xPDCCH sets (e.g., even though the numbers N and M may change, the product of N and M may be constant or fixed). Merely as an example, the total number of REs associated within a RBG may be 72 (e.g., 12*N*M may be 72). In an example, a RBG may determine a minimum precoding granularity, e.g., for the purposes of channel estimation associated with demodulation of control channel data (e.g., demodulation of xPDCCH).

In an example, multiple xPDCCH sets and associated RBG definitions may coexist within a cell or TRP. However, as discussed, in all cases the number of REs within a RBG may be 72, including both DMRS and control data.

In the configuration 300 of FIG. 3A, example RBGs 306_2, ..., 306_13 associated with a xPDCCH set for a UE 104a may be defined by N=1, M=6 (e.g., such that 12*N*M=72), and example RBGs 306_0, 306_1, 306_14, 306_15 associated with a xPDCCH set for a UE 104b may be defined by N=2, M=3 (e.g., such that 12*N*M=72). The configuration 300 is merely an example configuration of the RBGs, and the set 120 transmitted to the UE 104a may comprise information about the location of the RBGs comprising xPDCCHs intended for the UE 104a, size (e.g., values of N and M) of the RBGs, etc. The UE 104a, upon receiving the set 120, may be aware of the location of possible RBGs of the xPDCCHs in the received subframes.

In the configuration 330 of FIG. 3B, example RBGs 306_2, ..., 306_13 associated with a xPDCCH set in a Common Search Space (CSS) may be defined by N=1, M=6 (e.g., such that 12*N*M=72), and example RBGs 306_0, 306_1, 306_14, 306_15 associated with a xPDCCH set in a UE Specific Search Space (UESS) (e.g., for a specific UE) may be defined by N=2, M=3 (e.g., such that 12*N*M=72). Thus, upon receiving the set 120 defining the RBG configuration 330, the UE 104a may search the RBGs in the CSS, e.g., to possibly identify any xPDCCH intended for the UE 104a. Also, if an RBG (e.g., RBG 336_0) is intended specifically for the UE 104a, the UE 104a may look for xPDCCH in the location of the RBG 336_0. Thus, the UE 104a, upon receiving the set 120, may be aware of the location and/or the size of the RBGs comprising possible xPDCCHs in the received subframes that are intended for the UE 104a.

FIGS. 4A-4E illustrate example manners of logical to physical mapping of a set of RBGs, according to some embodiments. FIG. 4A illustrate a subframe 400 comprising 1 OFDM symbol, which may include RBGs 402_0, ..., 402_7 (e.g., each comprising 12 PRBs). In FIG. 4A, the mapping of the RBGs to a physical resource may be done sequentially, e.g., first RBG 402_0, followed by RBG 402_1, and so on.

FIG. 4B illustrate a subframe 420 comprising 2 OFDM symbols, which may include RBGs 426_0, 426_15 arranged in the manner depicted in the figure. In FIG. 4B, the mapping of the RBGs to the physical resource may be done in a time first manner. For example, the mapping may follow the dotted line, with RBG 426_0, 426_1 426_2, and so on. Thus, for example, the RBGs are mapped in a time first manner, such that RBGs received earlier are mapped before RBGs received at a later time.

FIGS. 4C-4D similarly illustrate various other examples of RBGs in the example subframes 440 and 460, respectively, and the example mapping are illustrated using respectively dotted lines.

FIG. 4E illustrate a subframe 480 comprising 2 OFDM symbols, which may include RBGs 486_0, 486_15 arranged in the manner depicted in the figure. In FIG. 4E, the mapping of the RBGs to the physical resource may be done in a frequency first manner. For example, the mapping may follow the dotted line, with RBG 426_0, 426_1 426_2, and so on, being mapped sequentially. Thus, for example, the RBGs are mapped in a frequency first manner, such that RBGs received over a first one or more frequency bandwidth (e.g., corresponding to a first OFDM symbol) are mapped earlier than the RBGs received over a second one or more frequency bandwidth.

In some embodiments, the time-first resource mapping illustrated in FIG. 4B may allow a smaller footprint in the frequency domain for a DCI payload, which may be useful for interference coordination in dense networks, as well efficient control and data multiplexing. Time first resource mapping may also allow joint channel estimation for multiple RBGs in a localized allocation, e.g., taking advantage of time correlation. Alternatively, a frequency-first resource mapping illustrated in FIG. 4E may be envisioned, which may allow symbol by symbol processing (e.g., leading to shorter delay) and higher frequency diversity for distributed allocations. FIG. 4D may be a combination of time first and frequency first mapping. In an example, in FIG. 4D, there may be two sets of resource blocks involved (e.g., a first set of resource blocks involving RBGs 466_0, 466_1, 466_14, and 466_15, and a second set of resource blocks involving RBGs 466_2, ..., 466_13), and in some examples (and although not illustrated in the figure), the mapping for the these two sets may be separate.

In some embodiments, the set 120 may indicate a logical to physical resource mapping for the set of RBGs, e.g., indicate whether a time-first mapping of FIG. 4B is employed, whether a frequency-first mapping of FIG. 4E is employed, and/or whether another type of mapping (e.g., indicated in FIGS. 4A, 4C-4D, or another appropriate type of mapping) is employed. The UE 104a may receive the set 120 and may be aware of the logical to physical resource mapping for the set of RBGs. This may facilitate the UE 104a to effectively map the RBGs and to read the RBGs in an intended sequence. For example, the UE 104a may read data from the RBGs in the sequence of the dotted arrows in FIGS. 4A-4E. For example, physical resources may be mapped in the RBGs in the sequence of the dotted arrows in FIGS. 4A-4E.

Figure 5B:
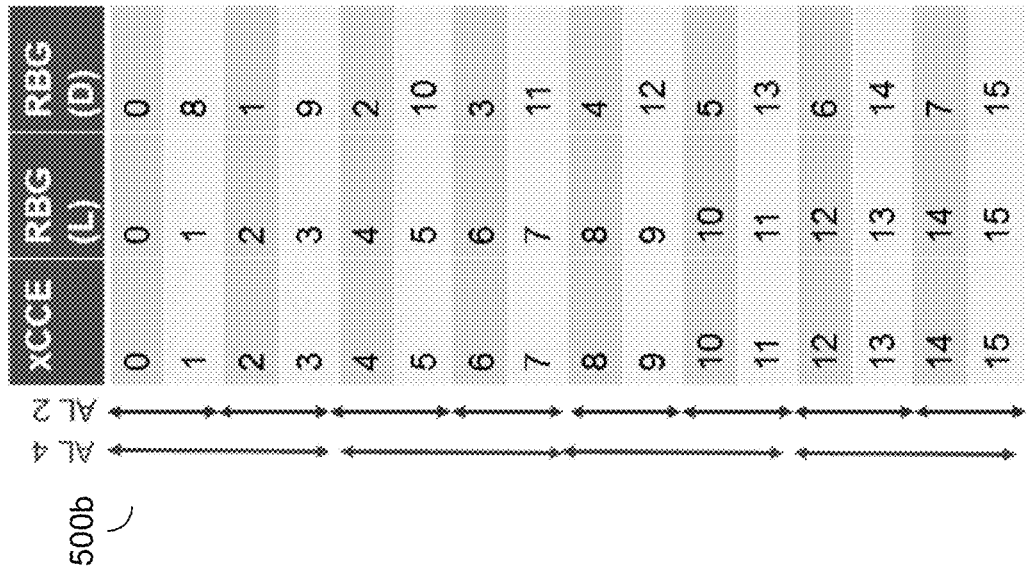
FIGS. 5A and 5B illustrate tables, which include two respective example mapping of a set of downlink 5G Control Channel Elements (xCCEs) to a set of RBGs, according to some embodiments.
Figure 5A:
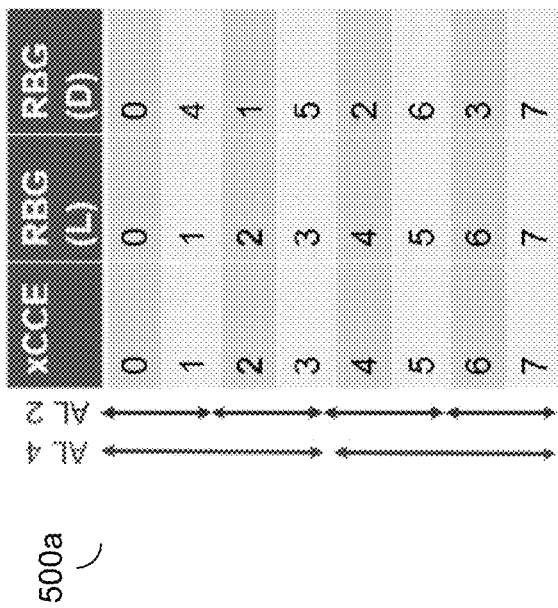

FIGS. 5A and 5B illustrate tables 500a and 500b, respectively, which include two respective example mapping of a set of downlink xCCEs to a set of RBGs, according to some embodiments. An xCCE may be defined as a unit of control channel data for transmitting an xPDCCH payload. In some embodiments, thus, an xCCE is mapped to one or more RBGs, where a RBG may be mapped to 12*N*M REs.

In one example, one of various aggregation levels may be used to transmit DL data. For example, transmission of xCCE using a higher code rate may lead to a lower aggregation level, and vice versa. Aggregation levels of 1, 2, 4, 8, or the like may be used, e.g., based on a plurality of factors such as channel quality, Signal to Noise Ratio (SNR), configuration of the UE and/or the eNB, available bandwidth, etc. Each of tables 500a and 500b illustrates the mapping for example aggregation levels 2 and 4.

In some embodiments, the table 500a may be for the case when the xPDCCH allocation region from a system perspective is partitioned to 8 RBGs, and the table 500b may be for the case when the xPDCCH allocation region from a system perspective is partitioned to 16 RBGs.

Each of the tables 500a and 500b illustrate two different mapping of xCCEs to RBGs—localized (indicated as "L" in the tables) and distributed (indicated as "D" in the tables). For example, for localized mapping, the mapping may be sequential; and for distributed mapping, the mapping may be non-sequential.

The aggregation level may dictate a number of xCCEs being included within a control data element. For example, for aggregation level 2, two xCCE may be included in a control data element (e.g., the control data element may include two RBGs); and for aggregation level 4, four xCCE may be included in a control data element (e.g., the control data element may include four RBGs).

Merely as an example, referring to the third column of the table 500a (e.g., assuming distributed mapping) and assuming an aggregation level of 4, a first control data element may include 4 xCCEs mapped to RBGs 0, 4, 1, and 5, in that sequence. Thus, data from the RBGs 0, 4, 1, and 5 may be sequentially arranged to form the first four xCCEs. Note that the RBGs 0, 4, 1, and 5 may be obtained after the RBGs are arranged in accordance with the logical to physical mapping discussed with respect to FIGS. 4A-4E.

Merely as another example, referring to the third column of the table 500a (e.g., assuming distributed mapping) and assuming an aggregation level of 4, a group of 4 xCCEs is mapped to RBGs 2, 6, 3, and 7, sequentially. Thus, data from the RBGs 2, 6, 3, and 7 may be sequentially arranged to form a second control data element. Note that the RBGs 2, 6, 3, and 7 may be obtained after the RBGs are arranged in accordance with the logical to physical mapping discussed with respect to FIGS. 4A-4E.

In some embodiments, the mapping of xCCEs to RBGs can be specific in a xPDCCH set (e.g., set 120). Thus, the set 120 may comprise one or more parameters to indicate the type of mapping used (e.g., localized versus distributed), the aggregation level used (e.g., AL 2, AL 4, etc.), and/or a number of RBGs in which a xPDCCH allocation region is partitioned into (e.g., 8 or 16 RBGs of tables 500a or 500b, respectively).

Figure 6C:
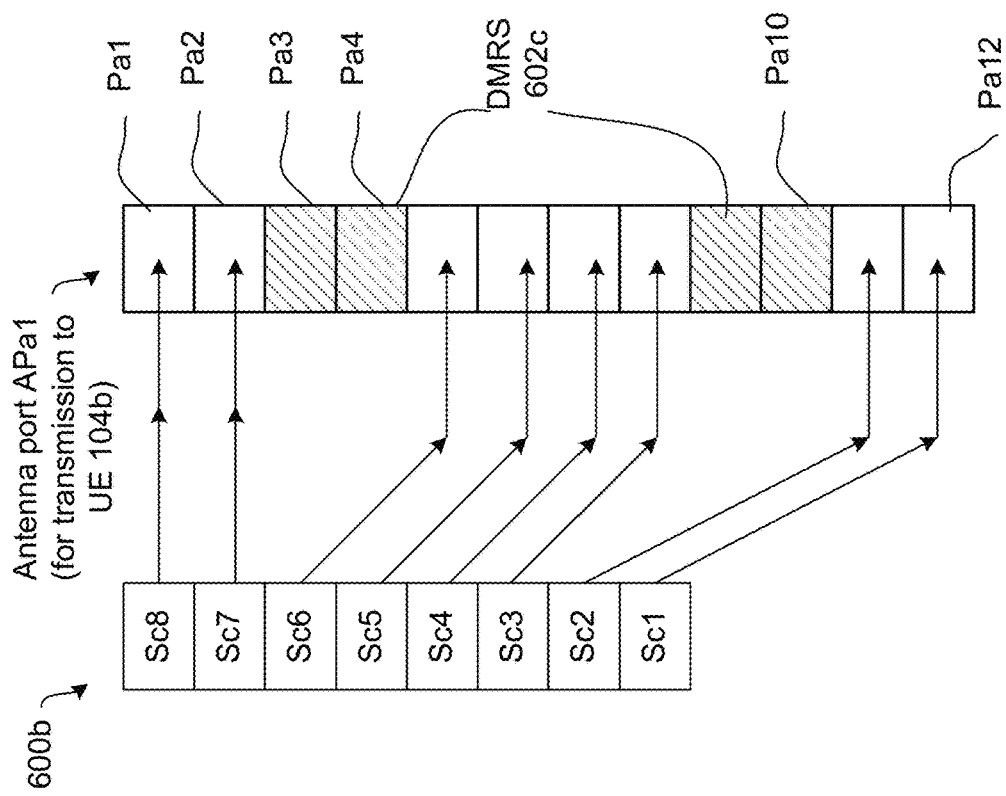
FIGS. 6B and 6C and control data illustrate example mappings of DMRS to a corresponding antenna port, according to some embodiments.

FIG. 6A illustrate an example mapping 600a of DMRS and control data to multiple antenna ports, according to some embodiments. In the example mapping 600a, the eNB 102 is assumed to use two antenna ports, APa0 and APa1, for transmission of downlink control channel data to the UE 104a. In an example, the antenna port APa0 may transmit DMRS in Resource Elements (REs) in 4 subcarriers, given by Pa3, Pa4, Pa9, Pa10; and the antenna port APa1 may transmit REs in the same 4 subcarriers, Pa3, Pa4, Pa9, Pa10. In an example, the shaded slots (e.g., in FIGS. 6A-6F) for DMRS transmission may be transmitted using Orthogonal Cover Codes (OCC). The REs are associated with, or included in, one or more xPDCCHs. Control data modulation symbols Sa1, . . . , Sa8 may be transmitted in subcarriers Pa1, Pa2, Pa5, Pa6, Pa7, Pa8, Pa11, Pa12.

For example, in the transmission scheme illustrated in FIG. 6A, the eNB 102 transmits xPDCCHs via antenna ports AP0 and AP1 to the same UE (e.g., to the UE 104a). Thus, FIG. 6A is an example of 2 port SFBC transmission.

In an example, FIG. 6A illustrates mapping for 12 subcarriers×1 symbol block. In an example, multiple such blocks may comprise an RBG. In terms of port mapping, in an example, a maximum of 2 ports may be used for transmission to a single UE, as illustrated in FIG. 6A. For example, 2 transmission ports may be used for SFBC transmission. For SFBC, in an example, all 72 REs in a RBG can be used for transmission of DMRS and/or control data.

Figure 6B:
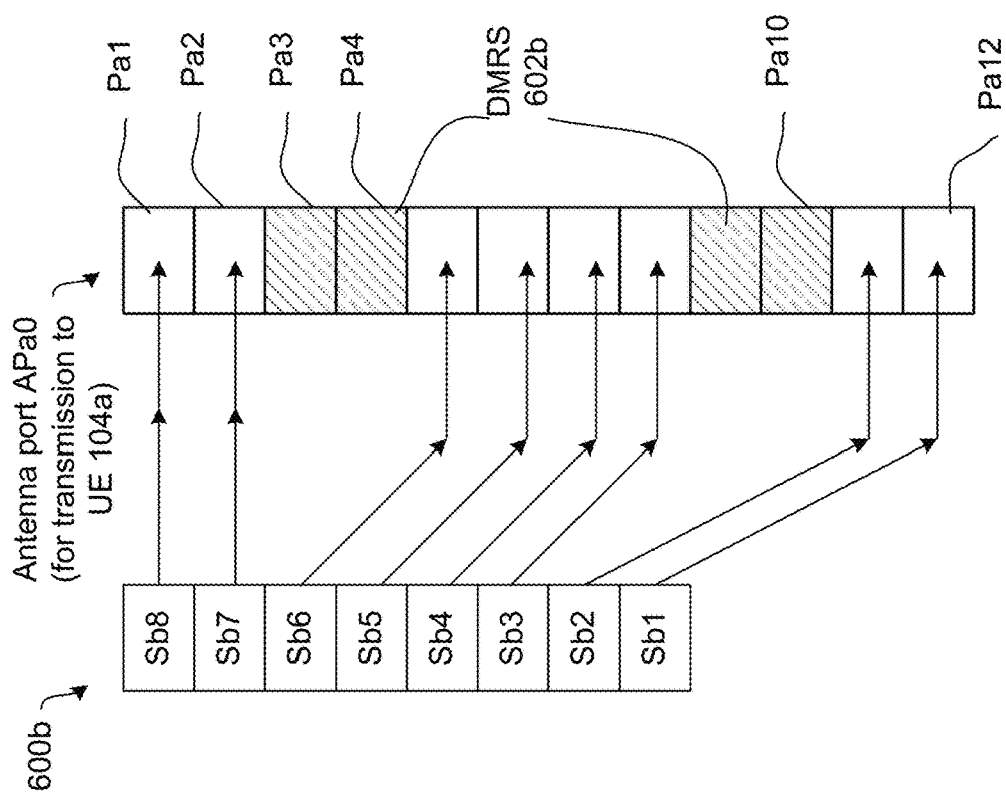

FIGS. 6B and 6C illustrate example mappings 600b and 600c, respectively, of DMRS and control data to a corresponding antenna port, according to some embodiments. For example, in FIG. 6B, the eNB 102 may transmit to the UE 104a via antenna port APa0; and in FIG. 6C, the eNB 102 may transmit to the UE 104b via antenna port APa1 using MU-MIMO transmission. Thus, FIG. 6B illustrates port APa0 being used for beamforming transmission to UE 104a, and FIG. 6C illustrates port APa1 being used for beamforming transmission to UE 104b.

Various components of FIGS. 6B and 6C will be apparent from respectively components of FIG. 6A, and hence, FIGS. 6B and 6C will not be discussed in further details herein.

In each of FIGS. 6A-6C, the DMRSs are in positioned in adjacent slots for transmission. For example, in FIG. 6B, consecutive slots Pa3 and Pa4 are allocated for transmission of DMRS 602b (e.g., the DMRS are transmitted using adjacent REs), which may be beneficial for interference averaging in some examples.

Figure 6F:
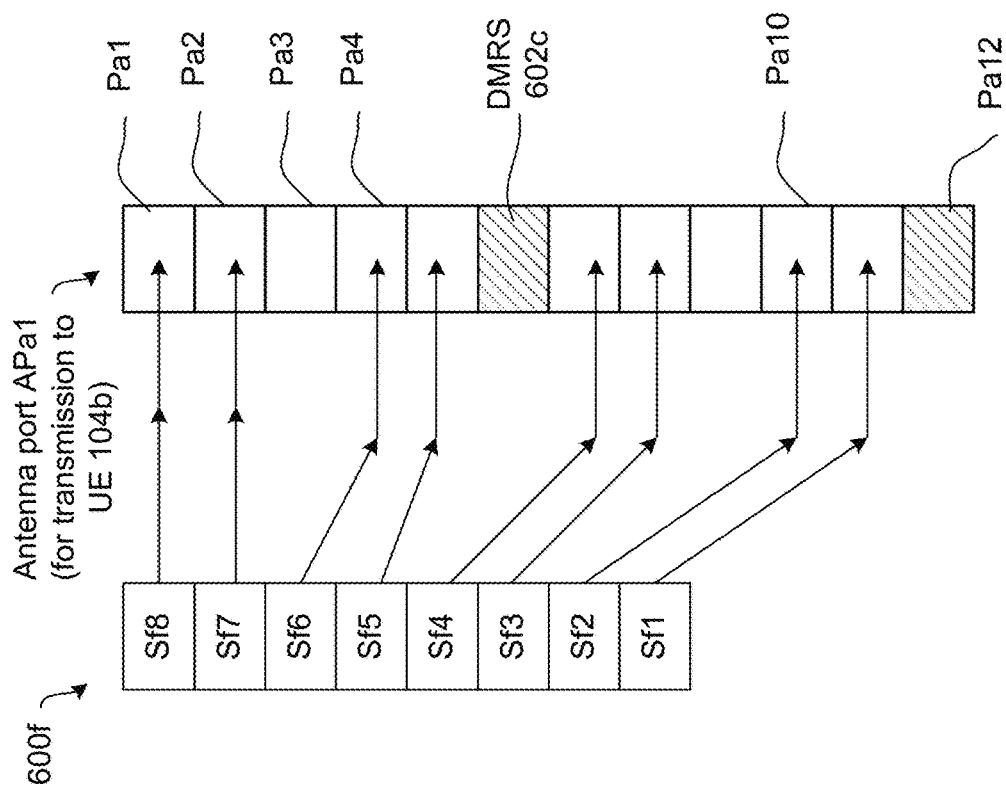
Figure 6E:
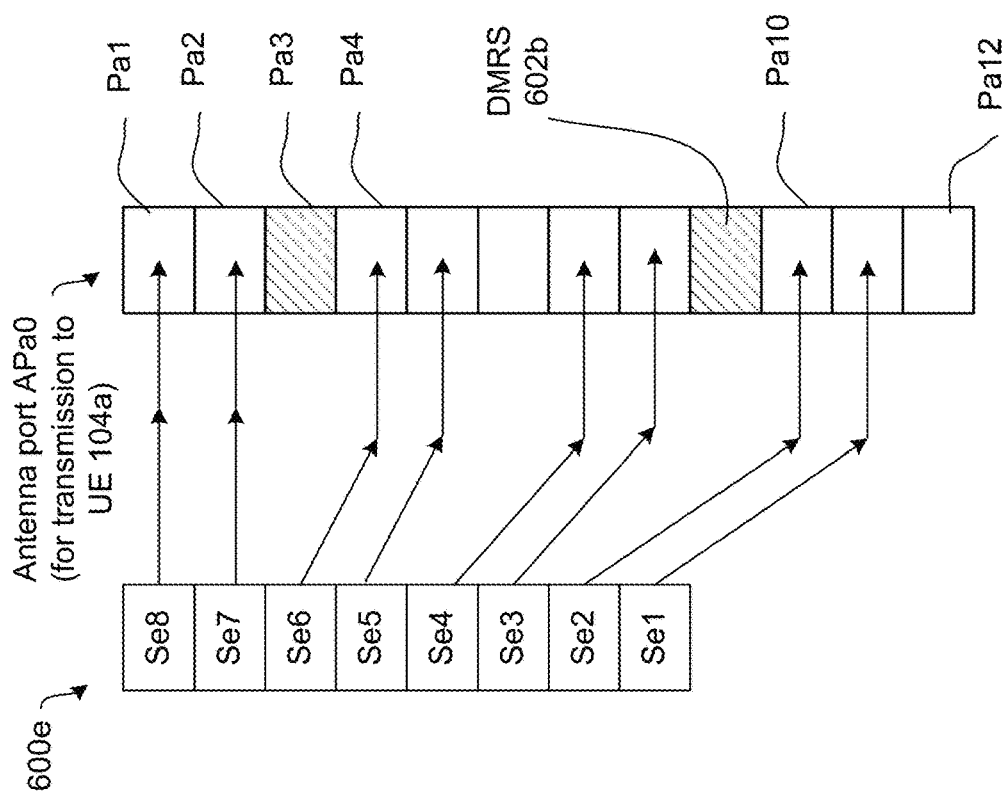

FIG. 6D-6F illustrate example mappings 600d-600f, respectively, of DMRS and control data to corresponding antenna port(s) in which DMRSs are transmitted over non-adjacent REs, according to some embodiments. For example, the mapping 600d of FIG. 6D is at least in part similar to the mapping 600a in FIG. 6A. However, unlike the mapping 600a, the mapping 600d comprises DMRSs being transmitted over non-adjacent REs. Similarly, FIGS. 6E-6F are at least in part similar to the mappings in FIGS. 6B-6C, respectively. However, unlike the mappings 600b and 600c, the mappings 600e and 600f comprise DMRSs being transmitted over non-adjacent REs.

Various components of FIGS. 6D-6F will be apparent from respectively components of FIGS. 6A-6C, and hence, FIGS. 6D-6F will not be discussed in further details herein.

In some embodiments, the xPDCCH set 120 transmitted from the eNB 02 to the UE 104a may comprise, for example, one or more parameters that may indicate the mapping and transmission scheme used in one or more of FIGS. 6A-6F. For example, the one or more parameters may indicate the number of eNB antenna ports used for xPDCCH transmission, relative positions of the control data symbols and DMRS in the REs of the RBGs of the xPDCCH, etc. Thus, based at least in part on the set 120, the UE 104a may be aware of the DMRS, control data and antenna port mapping, based at least in part on which the UE 104a may receive, identify and/or demodulate the xPDCCH received from the eNB 102.

Figure 7D:
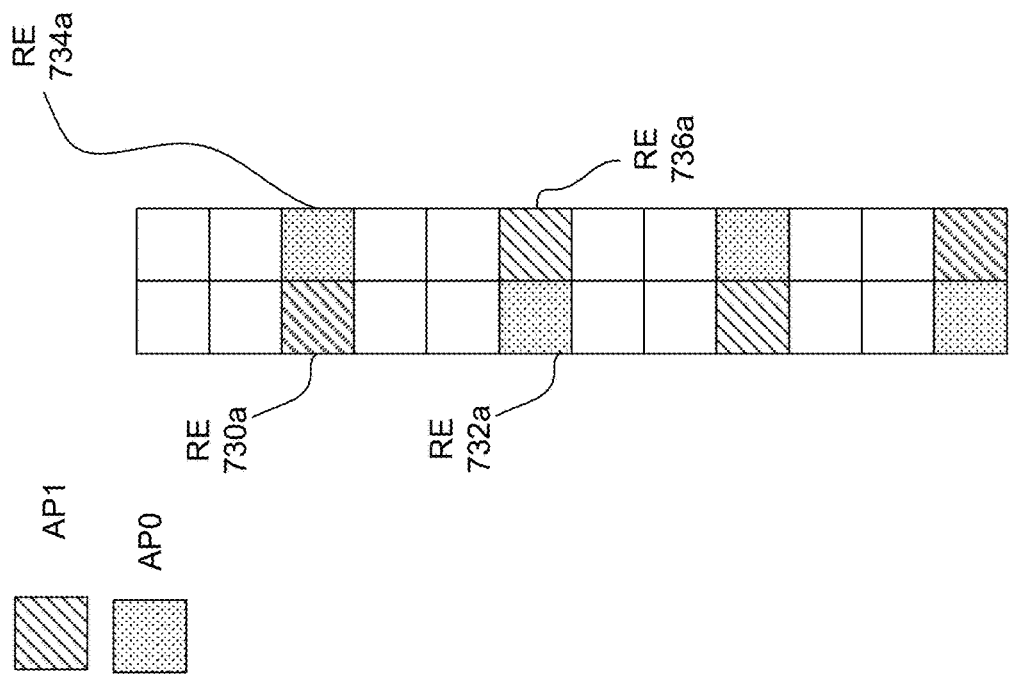

FIGS. 7A-7D illustrate various examples of mapping between DMRS/OCC and antenna ports, according to some embodiments. Referring to FIG. 7A, each of AP0 and AP1 may transmit DMRS or OCC in four adjacent REs (e.g., over two symbols). For example, AP0 may transmit REs 710a, 712a, 714a, and 716a, which are four adjacent REs. Similarly, AP1 may transmit REs 710b, 712b, 714b, and 716b, which are four adjacent REs. Also, transmission of the REs by AP0 and AP1 may be simultaneous or near simultaneous. For example, REs 710a and 710b may be transmitted simultaneous or near simultaneous by AP0 and AP1, respectively. Similarly, REs 712a and 712b may be transmitted simultaneous or near simultaneous by AP0 and AP1, respectively, and so on. The REs 710a, . . . , 716a, 710b, 716b may be associated with DMRS or OCC transmission. The shaded boxes (with checkered shadings) may represent simultaneous transmission of DMRS or OCC by the two antenna ports AP0 and AP1. The RBGs in the example of FIG. 7A may span two OFDM symbols, e.g., similar to the any of the RBGs 3060, 3061, or the like (see FIG. 3A and FIG. 4C).

FIG. 7B is at least in part similar to FIG. 7A. A difference between these two figures are the values of some of the REs that constitutes the DMRS or OCC. For example, the RE 714b in FIG. 7A is represented by a +1, while the same RE in FIG. 7B is represented by a −1. Thus, FIGS. 7B-7B show that different values of these REs for DMRS or OCC may be possible. Merely as an example, FIG. 7A may allow length −2 OCC in the frequency domain. Also, merely as an example, FIG. 7B may allow length −2 OCC in the frequency domain and a length −2 OCC in the time domain (equivalently a length 4 OCC).

Figure 7C:
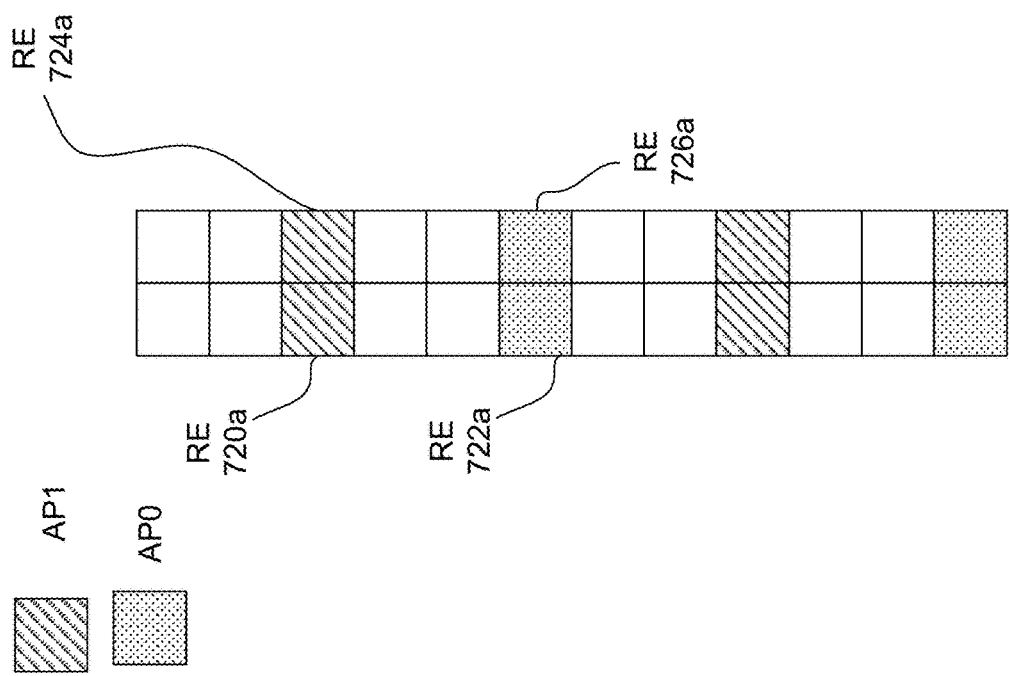

In FIGS. 7A-7B, the two antenna ports AP0 and AP1 may transmit simultaneously or near simultaneously the REs associated with DMRS or OCC. In contrast, each of FIGS. 7C-7D represents examples of non-simultaneous transmission of the REs associated with DMRS or OCC. For example, similar to FIG. 7A-7B, the RBGs associated with DMRS or OCC in FIGS. 7C-7D span over two OFDM symbols. The transmission of the RBGs by AP0 is illustrated using dotted boxes, while the transmission of the RBGs by AP1 is illustrated using diagonally shaded boxes. For example, in FIG. 7C, AP1 may transmit REs 720a and 724a, and AP0 may transmit REs 722a and 726a, where the transmission by AP0 and AP1 may be non-simultaneous. In the example of FIG. 7D, AP1 may transmit REs 730a and 736a, and AP0 may transmit REs 734a and 732a, where the transmission by AP0 and AP1 may be non-simultaneous.

Thus, FIGS. 7A-7D illustrate example mapping of DMRS or OCC to the antenna ports AP0 and AP1. In some embodiments, the set 120 of FIG. 1 may comprise one or more parameters that may inform the UE 104a of the mapping from the DMRS or OCC to the antenna ports AP0 and AP1, based on which the UE 104a may receive the DMRS or OCC, and estimate the channel.

In some embodiments, a UE (e.g., UE 104a) may be configured with one or multiple xPDCCH sets (e.g., set 120, and possible other xPDCCH sets). The UE may indicate its capability for xPDCCH processing via UE capability and/or category signaling to the eNB. Based on such signaling, an eNB may configure the UE with one or more xPDCCH sets. For a xPDCCH, the eNB may further configure one or more of the following: a DCI payload size, a DCI grant type (Uplink, Downlink, Sidelink, or a combination thereof), a type of search space (UE-specific/common-search space/UE-group-specific, etc.), one or more additional type of operations the UE may perform (e.g., used for radio link monitoring, etc.), transmission scheme for xPDCCH, etc. Once the UE receives and process the one or more xPDCCH sets, the UE may receive and/or demodulate the xPDCCHs, based at least in part on the one or more xPDCCH sets.

Figure 8:
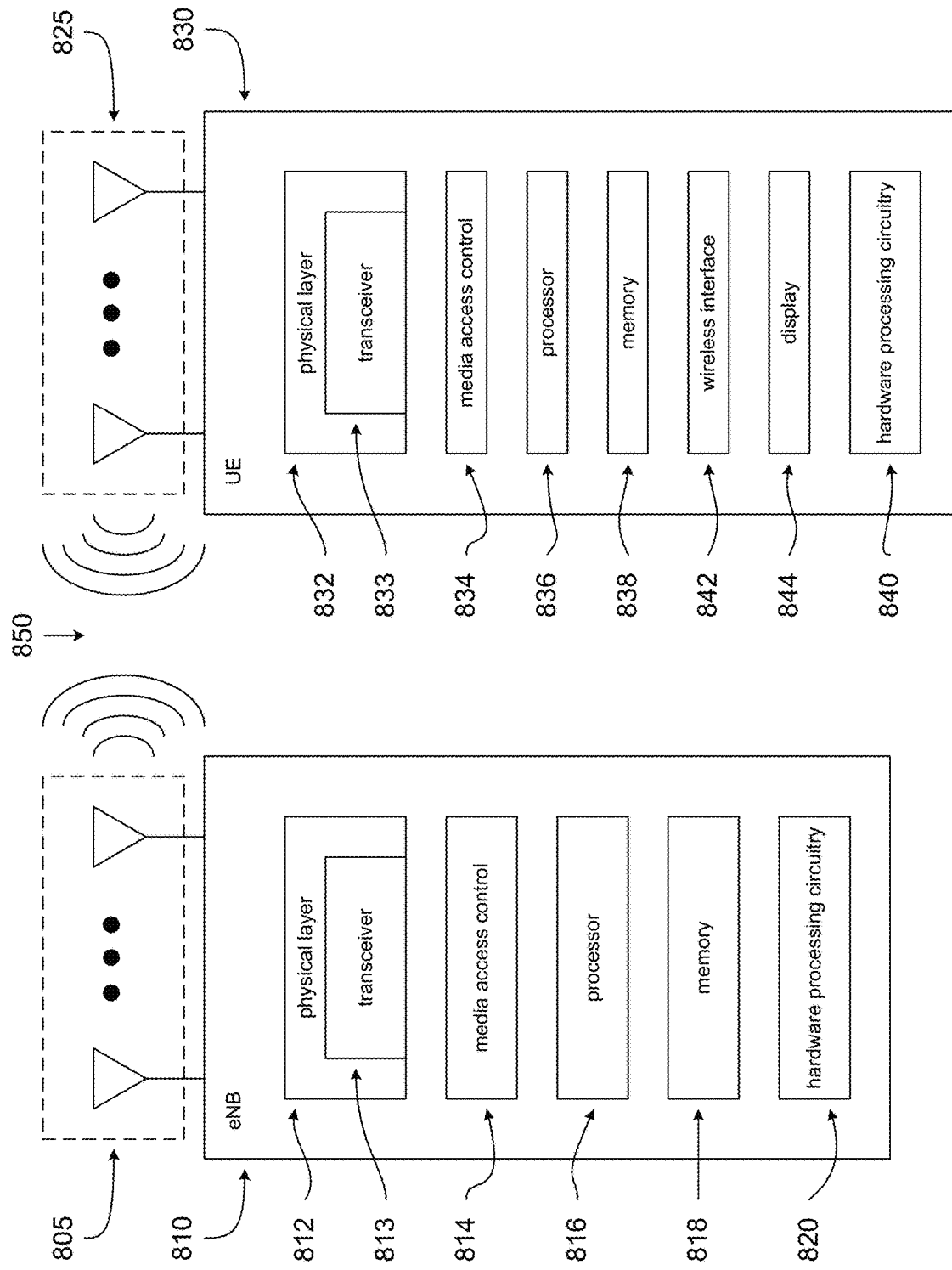
FIG. 8 illustrates an eNB and a UE, according to some embodiments.

FIG. 8 illustrates an eNB and a UE, according to some embodiments. FIG. 8 includes block diagrams of an eNB 810 and a UE 830 which are operable to co-exist with each other and other elements of an LTE network. High-level, simplified architectures of eNB 810 and UE 830 are described so as not to obscure the embodiments. It should be noted that in some embodiments, eNB 810 may be a stationary non-mobile device.

eNB 810 is coupled to one or more antennas 805, and UE 830 is similarly coupled to one or more antennas 825. However, in some embodiments, eNB 810 may incorporate or comprise antennas 805, and UE 830 in various embodiments may incorporate or comprise antennas 825.

In some embodiments, antennas 805 and/or antennas 825 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 805 are separated to take advantage of spatial diversity.

eNB 810 and UE 830 are operable to communicate with each other on a network, such as a wireless network. eNB 810 and UE 830 may be in communication with each other over a wireless communication channel 850, which has both a downlink path from eNB 810 to UE 830 and an uplink path from UE 830 to eNB 810.

As illustrated in FIG. 8, in some embodiments, eNB 810 may include a physical layer circuitry 812, a MAC (media access control) circuitry 814, a processor 816, a memory 818, and a hardware processing circuitry 820. A person skilled in the art will appreciate that other components not shown may be used in addition to the components shown to form a complete eNB.

In some embodiments, physical layer circuitry 812 includes a transceiver 813 for providing signals to and from UE 830. Transceiver 813 provides signals to and from UEs or other devices using one or more antennas 805. In some embodiments, MAC circuitry 814 controls access to the wireless medium. Memory 818 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 820 may comprise logic devices or circuitry to perform various operations. In some embodiments, processor 816 and memory 818 are arranged to perform the operations of hardware processing circuitry 820, such as operations described herein with reference to logic devices and circuitry within eNB 810 and/or hardware processing circuitry 820.

Accordingly, in some embodiments, eNB 810 may be a device comprising an application processor, a memory, one or more antenna ports, and an interface for allowing the application processor to communicate with another device.

As is also illustrated in FIG. 8, in some embodiments, UE 830 may include a physical layer circuitry 832, a MAC circuitry 834, a processor 836, a memory 838, a hardware processing circuitry 840, a wireless interface 842, and a display 844. A person skilled in the art would appreciate that other components not shown may be used in addition to the components shown to form a complete UE.

In some embodiments, physical layer circuitry 832 includes a transceiver 833 for providing signals to and from eNB 810 (as well as other eNBs). Transceiver 833 provides signals to and from eNBs or other devices using one or more antennas 825. In some embodiments, MAC circuitry 834 controls access to the wireless medium. Memory 838 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 842 may be arranged to allow the processor to communicate with another device. Display 844 may provide a visual and/or tactile display for a user to interact with UE 830, such as a touch-screen display. Hardware processing circuitry 840 may comprise logic devices or circuitry to perform various operations. In some embodiments, processor 836 and memory 838 may be arranged to perform the operations of hardware processing circuitry 840, such as operations described herein with reference to logic devices and circuitry within UE 830 and/or hardware processing circuitry 840.

Accordingly, in some embodiments, UE 830 may be a device comprising an application processor, a memory, one or more antennas, a wireless interface for allowing the application processor to communicate with another device, and a touch-screen display.

Elements of FIG. 8, and elements of other figures having the same names or reference numbers, can operate or function in the manner described herein with respect to any such figures (although the operation and function of such elements is not limited to such descriptions). For example, UEs, and/or hardware processing circuitry of UEs, and the embodiments described with respect to FIG. 8 and FIGS. 1-7 can operate or function in the manner described herein with respect to any of the figures.

In addition, although eNB 810 and UE 830 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 9:
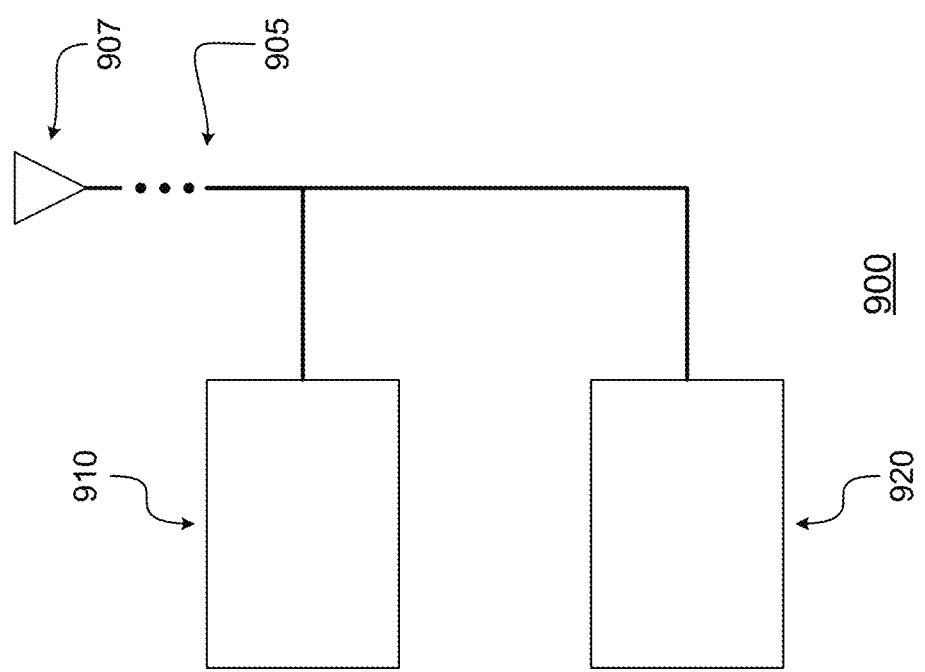
FIG. 9 illustrates hardware processing circuitries for an eNB to transmit a xPDCCH set to a UE, e.g., to enable the UE to identify parameters within the xPDCH set, and use the parameters to receive, demodulate and/or decode corresponding xPDCCHs, according to some embodiments.

FIG. 9 illustrates hardware processing circuitries for an eNB to transmit a xPDCCH set (e.g., xPDCCH set 120 of FIG. 1) to a UE (e.g., UE 104a), e.g., to enable the UE to identify parameters within the xPDCH set, and use the parameters to receive, demodulate and/or decode corresponding xPDCCHs, according to some embodiments. With reference to FIG. 8, an eNB may include various hardware processing circuitries discussed below (such as hardware processing circuitry 820 of FIG. 8), which may in turn comprise logic devices and/or circuitry operable to perform various operations. For example, in FIG. 8, eNB 810 (or various elements or components therein, such as hardware processing circuitry 820, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 816 (and/or one or more other processors which eNB 810 may comprise), memory 818, and/or other elements or components of eNB 810 (which may include hardware processing circuitry 820) may be arranged to perform the operations of these hardware processing circuitries, such as operations described herein with reference to devices and circuitry within these hardware processing circuitries. In some embodiments, processor 816 (and/or one or more other processors which eNB 810 may comprise) may be a base-band processor.

Returning to FIG. 9, an apparatus of eNB 810 (or another eNB or base station), which may be operable to communicate with one or more UEs on a wireless network, may comprise hardware processing circuitry 900. In some embodiments, hardware processing circuitry 900 may comprise one or more antenna ports 905 operable to provide various transmissions over a wireless communication channel (such as wireless communication channel 850). Antenna ports 905 may be coupled to one or more antennas 907 (which may be antennas 805). In some embodiments, hardware processing circuitry 900 may incorporate antennas 907, while in other embodiments, hardware processing circuitry 900 may merely be coupled to antennas 907.

Antenna ports 905 and antennas 907 may be operable to provide signals from an eNB to a wireless communications channel and/or a UE, and may be operable to provide signals from a UE and/or a wireless communications channel to an eNB. For example, antenna ports 905 and antennas 907 may be operable to provide transmissions from eNB 810 to wireless communication channel 850 (and from there to UE 830, or to another UE). Similarly, antennas 907 and antenna ports 905 may be operable to provide transmissions from a wireless communication channel 850 (and beyond that, from UE 830, or another UE) to eNB 810.

Hardware processing circuitry 900 may comprise various circuitries operable in accordance with the various embodiments discussed herein. With reference to FIG. 9, hardware processing circuitry 900 may comprise a first circuitry 910 and/or a second circuitry 920.

In some embodiments, first circuitry 910 and/or second circuitry 920 may be implemented as separate circuitries. In other embodiments, first circuitry 910 and/or second circuitry 920 may be combined and implemented together in a circuitry without altering the essence of the embodiments.

In some embodiments, the first circuitry 910 may be configured to establish a parameter set that defines 5G Physical Downlink Control Channel (xPDCCH) for transmission to the UE. In some embodiments, the second circuitry 920 may be configured to generate, for transmission to the UE, one or more messages comprising the parameter set.

In some embodiments, the eNB may comprise an interface to output the one or more messages, including the parameter set, to a transceiver circuitry, for transmission to the UE. In some embodiments, the hardware processing circuitry 900 may comprise a third circuitry to generate, for transmission to the UE, a first xPDCCH in accordance with the parameter set. In some embodiments, the one or more message may comprise a first message including a first parameter of the parameter set and a second message including a second parameter of the parameter set, and wherein to generate the one or more messages, the second circuitry 920 may generate the first message for transmission to the UE via broadcast signaling that are to be received by a plurality of UEs; and generate the second message for transmission to specifically the UE via unicast signaling.

In some embodiments, to establish the parameter set, the first circuitry 910 may establish one or more parameters that are to identify a size of a Resource Block Group (RBG) within individual subframes, the RBG associated with the xPDCCH; and include, within the parameter set, the one or more parameters for transmission to the UE. In some embodiments, the size of the RBG may be measured in terms of a first number of consecutive symbols and a second number of consecutive Physical Resource Block (PRB). In some embodiments, the RBG is a first RBG, the size is a first size, and wherein the one or more parameters may identify: the first size of the first RBG, a second size of a second RBG, and locations of the first RBG of the first size and the second RBG of the second size within a subframe, wherein the first RBG and the second RBG to be located in a single subframe, and wherein the second size is different from the first size.

In some embodiments, to establish the parameter set, the first circuitry 910 may establish one or more parameters that are to identify a logical to physical mapping for a set of Resource Block Groups (RBGs) of one or more xPDCCHs; and include, within the parameter set, the one or more parameters for transmission to the UE. In some embodiments, the logical to physical mapping for the set of Resource Block Groups (RBGs) may be in accordance with at least one of: a time first mapping, or a frequency first mapping. In some embodiments, to establish the parameter set, the first circuitry 910 may establish one or more parameters that are to identify a mapping between 5G Control Channel Elements (xCCEs) and Resource Block Groups (RBGs) of one or more xPDCCHs; and include, within the parameter set, the one or more parameters for transmission to the UE. In some embodiments, to establish the parameter set, the first circuitry 910 may establish one or more parameters that are to identify one or more types of search spaces for Resource Block Groups (RBGs) of one or more xPDCCHs; and include, within the parameter set, the one or more parameters for transmission to the UE. In some embodiments, to establish the parameter set, the first circuitry 910 may establish one or more parameters that are to identify a mapping between Demodulation Reference Signals (DMRS) of one or more xPDCCHs and one or more antenna ports of the apparatus; and include, within the parameter set, the one or more parameters for transmission to the UE. In some embodiments, the one or more antenna ports comprises two antenna ports, and the eNB may cause transmission of one or more xPDCCHs to the UE in accordance with the Space Frequency Block Code (SFBC) transmission scheme. In some embodiments, the one or more antenna ports comprises a first antenna port, and the eNB may cause transmission of one or more xPDCCHs to the UE in accordance with single layer beamforming. In some embodiments, to establish the parameter set, the first circuitry 910 may establish one or more parameters that are to map a Resource Block Group (RBG) to a set of contiguous physical Resource Elements (REs) comprising Demodulation Reference Signals (DMRS) and control channel data; and include, within the parameter set, the one or more parameters for transmission to the UE.

Figure 10:
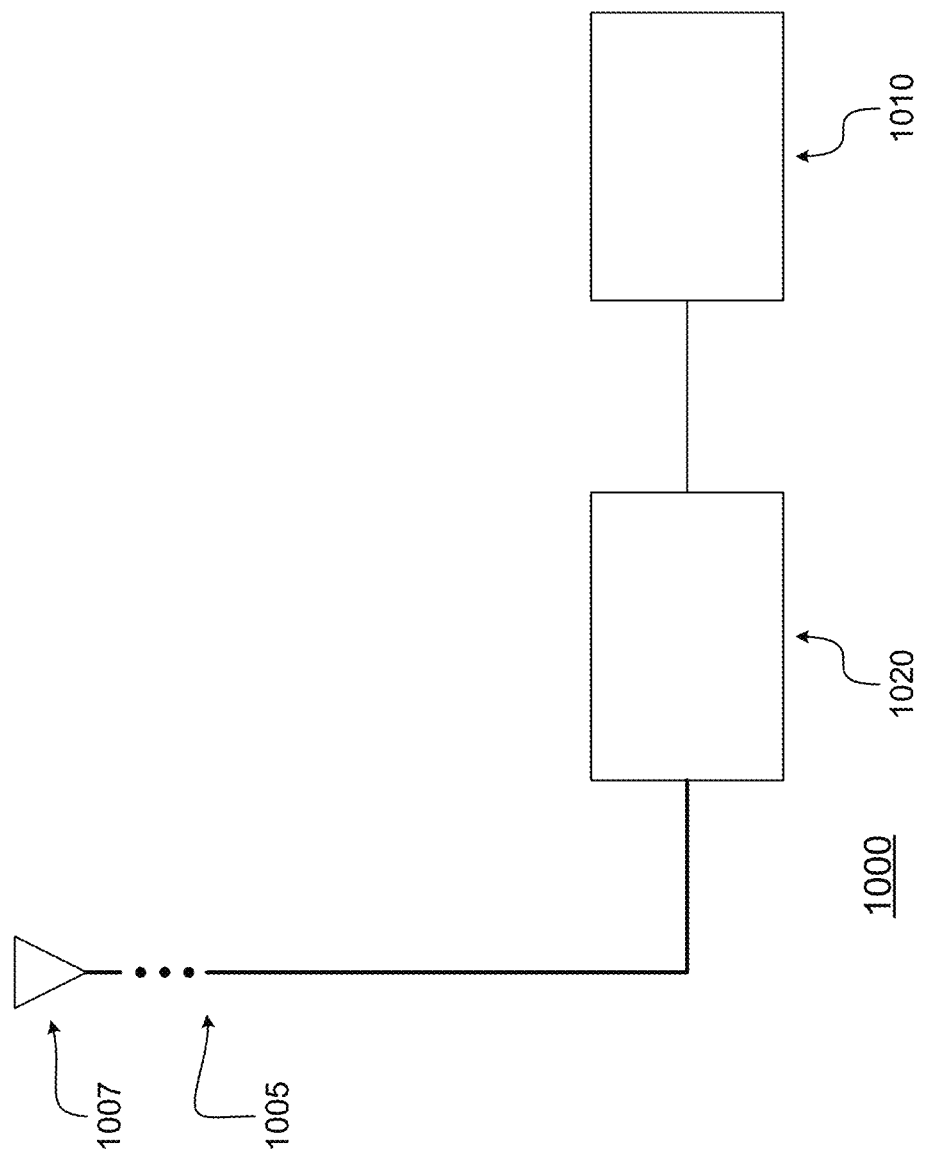
FIG. 10 illustrates hardware processing circuitries for a UE to receive a xPDCCH set, identify parameters within the xPDCH set, and use the parameters to receive, demodulate and/or decode corresponding xPDCCHs, according to some embodiments.

FIG. 10 illustrates hardware processing circuitries for a UE (e.g., UE 104a of FIG. 1) to receive a xPDCCH set (e.g., xPDCCH set 120), identify parameters within the xPDCH set, and use the parameters to receive, demodulate and/or decode corresponding xPDCCHs, according to some embodiments. With reference to FIG. 8, a UE may include various hardware processing circuitries discussed below (such as hardware processing circuitry 840 of FIG. 8), which may in turn comprise logic devices and/or circuitry operable to perform various operations. For example, in FIG. 8, UE 830 (or various elements or components therein, such as hardware processing circuitry 840, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 836 (and/or one or more other processors which UE 830 may comprise), memory 838, and/or other elements or components of UE 830 (which may include hardware processing circuitry 840) may be arranged to perform the operations of these hardware processing circuitries, such as operations described herein with reference to devices and circuitry within these hardware processing circuitries. In some embodiments, processor 836 (and/or one or more other processors which UE 830 may comprise) may be a baseband processor.

Returning to FIG. 10, an apparatus of UE 830 (or another UE or mobile handset), which may be operable to communicate with one or more eNBs on a wireless network, may comprise hardware processing circuitry 1000. In some embodiments, hardware processing circuitry 1000 may comprise one or more antenna ports 1005 operable to provide various transmissions over a wireless communication channel (such as wireless communication channel 850). Antenna ports 1005 may be coupled to one or more antennas 1007 (which may be antennas 825). In some embodiments, hardware processing circuitry 1000 may incorporate antennas 1007, while in other embodiments, hardware processing circuitry 1000 may merely be coupled to antennas 1007.

Antenna ports 1005 and antennas 1007 may be operable to provide signals from a UE to a wireless communications channel and/or an eNB, and may be operable to provide signals from an eNB and/or a wireless communications channel to a UE. For example, antenna ports 1005 and antennas 1007 may be operable to provide transmissions from UE 830 to wireless communication channel 850 (and from there to eNB 810, or to another eNB). Similarly, antennas 1007 and antenna ports 1005 may be operable to provide transmissions from a wireless communication channel 850 (and beyond that, from eNB 810, or another eNB) to UE 830.

Hardware processing circuitry 1000 may comprise various circuitries operable in accordance with the various embodiments discussed herein. With reference to FIG. 10, hardware processing circuitry 1000 may comprise a first circuitry 1010 and/or a second circuitry 1020.

In some embodiments, first circuitry 1010 and/or second circuitry 1020 may be implemented as separate circuitries. In other embodiments, first circuitry 1010 and second circuitry 1020 may be combined and implemented together in a circuitry without altering the essence of the embodiments.

In some embodiments, the first circuitry 1010 may be configured to process a parameter set received from the eNB, the parameter set to define Cross Link Physical Downlink Control Channel (xPDCCH). In some embodiments, the second circuitry 1020 may be configured to process one or more xPDCCH messages in accordance with the parameter set. In some embodiments, the UE may comprise a memory to store at least a part of the parameter set.

In some embodiments, the parameter set comprises at least a first parameter received via a first message and a second parameter received via a second message, and wherein to process the parameter set, the first circuitry 1010 is to process the first message that is received via broadcast signaling, the broadcast signaling transmitted to a plurality of UEs; and process the second message that is received via unicast signaling. In some embodiments, to process the parameter set, the first circuitry 1010 is to process one or more parameters that are to identify a size of a Resource Block Group (RBG) within individual subframes, the RBG associated with the xPDCCH. In some embodiments, to process the parameter set, the first circuitry 1010 is to process one or more parameters that are to identify a mapping between 5G Control Channel Elements (xCCEs) and Resource Block Groups (RBGs) of one or more xPDCCHs. In some embodiments, to process the parameter set, the first circuitry 1010 is to process one or more parameters that are to identify one or more types of search spaces for Resource Block Groups (RBGs) of one or more xPDCCHs. In some embodiments, to process the parameter set, the first circuitry 1010 is to process one or more parameters that are to identify a mapping between Demodulation Reference Signals (DMRS) of one or more xPDCCHs and one or more antenna ports of the apparatus. In some embodiments, to process the parameter set, the first circuitry 1010 is to process one or more parameters that are to map a Resource Block Group (RBG) to a set of contiguous physical Resource Elements (REs) comprising Demodulation Reference Signals (DMRS) and control channel data.

Figure 11A:
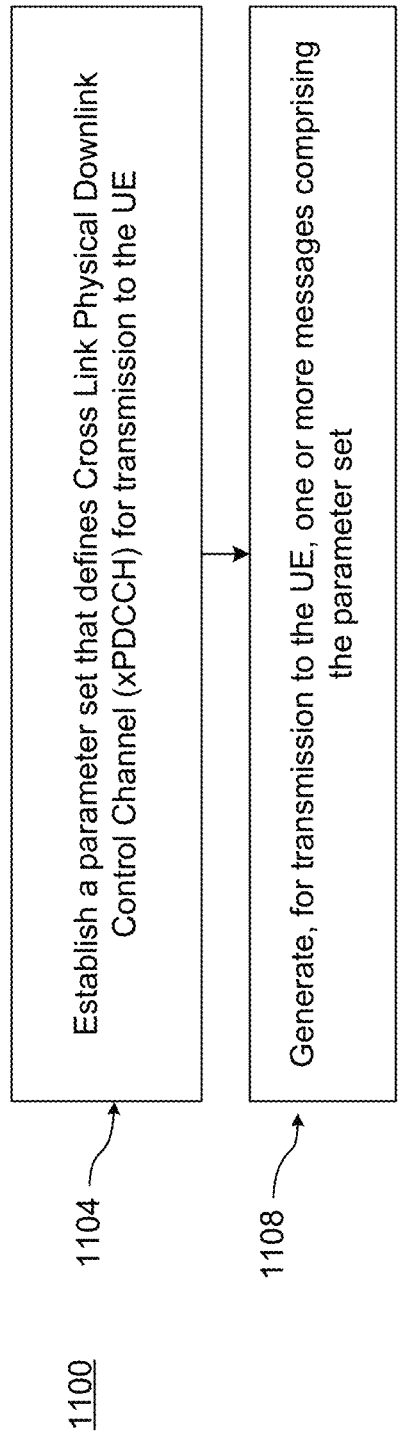
FIG. 11A illustrates a method for an eNB to transmit a xPDCCH set to a UE, e.g., to enable the UE to identify parameters within the xPDCH set and use the parameters to receive, demodulate and/or decode corresponding xPDCCHs, in accordance with some embodiments of the disclosure.

FIG. 11A illustrates a method 1100 for an eNB to transmit a xPDCCH set (e.g., xPDCCHset 120 of FIG. 1) to a UE (e.g., UE 104*a*), e.g., to enable the UE to identify parameters within the xPDCH set and use the parameters to receive, demodulate and/or decode corresponding xPDCCHs, in accordance with some embodiments of the disclosure. With reference to FIG. 8, various methods that may relate to eNB 810 and hardware processing circuitry 820 are discussed below. Although the actions in method 1100 are shown in a particular order, the order of the actions can be modified. Thus, the illustrated embodiments can be performed in a different order, and some actions may be performed in parallel. Some of the actions and/or operations listed in FIG. 11A are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 810 and/or hardware processing circuitry 820 to perform an operation comprising the method 1100 of FIG. 11A. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the method of FIG. 11A.

Returning to FIG. 11A, the method 1100 may be in accordance with the various embodiments discussed herein. The method 1100 may comprise, at 1104, establishing a parameter set that defines 5G Physical Downlink Control Channel (xPDCCH) for transmission to the UE. The method 1100 may comprise, at 1108, generating, for transmission to the UE, one or more messages comprising the parameter set.

In some embodiments, the method 1100 may also comprise generating, for transmission to the UE, a first xPDCCH in accordance with the parameter set. In some embodiments, the one or more message comprises a first message including a first parameter of the parameter set and a second message including a second parameter of the parameter set, and wherein to generate the one or more messages, the method may comprise: generating the first message for transmission to the UE via broadcast signaling that are to be received by a plurality of UEs; and generating the second message for transmission to specifically the UE via unicast signaling.

In some embodiments, to establish the parameter set, the method may comprise establishing one or more parameters that are to identify a size of a Resource Block Group (RBG) within individual subframes, the RBG associated with the xPDCCH; and including, within the parameter set, the one or more parameters for transmission to the UE. In some embodiments, the size of the RBG is measured in terms of a first number of consecutive symbols and a second number of consecutive Physical Resource Block (PRB). In some embodiments, the RBG is a first RBG, the size is a first size, and wherein the one or more parameters are to identify: the first size of the first RBG, a second size of a second RBG, and locations of the first RBG of the first size and the second RBG of the second size within a subframe, wherein the first RBG and the second RBG to be located in a single subframe, and wherein the second size is different from the first size.

In some embodiments, to establish the parameter set, the method may comprise establishing one or more parameters that are to identify a logical to physical mapping for a set of Resource Block Groups (RBGs) of one or more xPDCCHs; and including, within the parameter set, the one or more parameters for transmission to the UE. In some embodiments, the logical to physical mapping for the set of Resource Block Groups (RBGs) are in accordance with at least one of: a time first mapping, or a frequency first mapping. In some embodiments, to establish the parameter set, the method may comprise establishing one or more parameters that are to identify a mapping between 5G Control Channel Elements (xCCEs) and Resource Block Groups (RBGs) of one or more xPDCCHs; and including, within the parameter set, the one or more parameters for transmission to the UE. In some embodiments, to establish the parameter set, the method may comprise establishing one or more parameters that are to identify one or more types of search spaces for Resource Block Groups (RBGs) of one or more xPDCCHs; and including, within the parameter set, the one or more parameters for transmission to the UE. In some embodiments, to establish the parameter set, the method may comprise establishing one or more parameters that are to identify a mapping between Demodulation Reference Signals (DMRS) of one or more xPDCCHs and one or more antenna ports of the apparatus; and including, within the parameter set, the one or more parameters for transmission to the UE. In some embodiments, wherein the one or more antenna ports comprises two antenna ports, and wherein the method may comprise: causing transmission of one or more xPDCCHs to the UE in accordance with the Space Frequency Block Code (SFBC) transmission scheme. In some embodiments, the one or more antenna ports comprises a first antenna port, and wherein the method may comprise: causing transmission of one or more xPDCCHs to the UE in accordance with single layer beamforming. In some embodiments, to establish the parameter set, the method may comprise establishing one or more parameters that are to map a Resource Block Group (RBG) to a set of contiguous physical Resource Elements (REs) comprising Demodulation Reference Signals (DMRS) and control channel data; and including, within the parameter set, the one or more parameters for transmission to the UE.

Figure 11B:
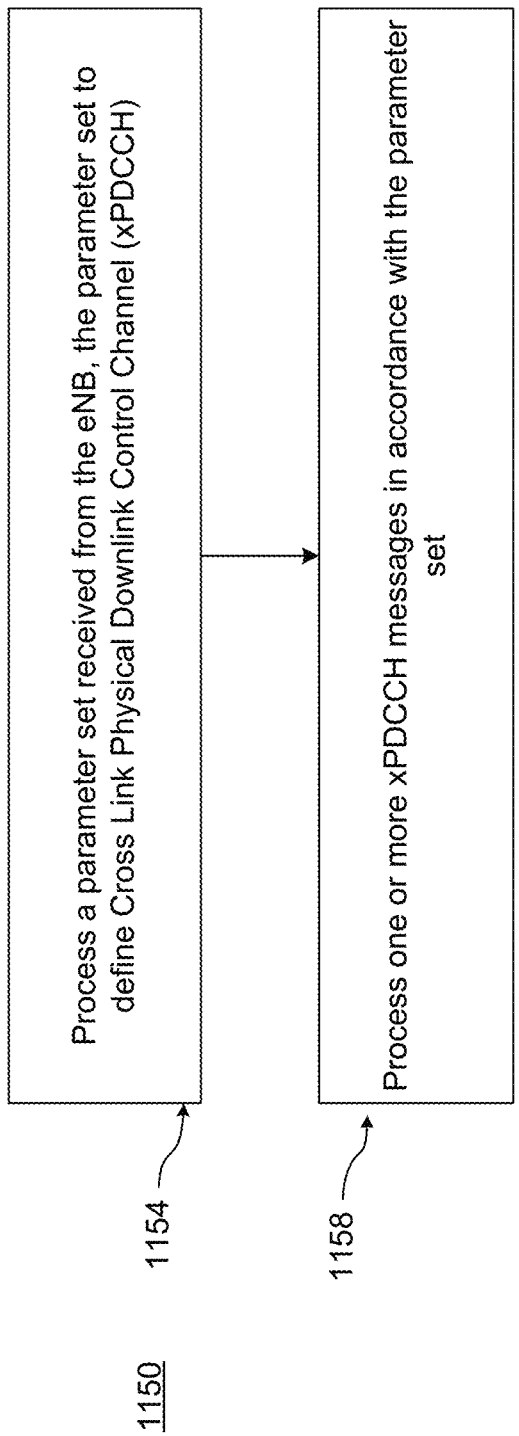
FIG. 11B illustrates a method for a UE for to receive a xPDCCH set, identify parameters within the xPDCH set, and use the parameters to receive, demodulate and/or decode corresponding xPDCCHs, according to some embodiments.

FIG. 11B illustrates a method 1150 for a UE for to receive a xPDCCH set (e.g., xPDCCH set 120), identify parameters within the xPDCH set, and use the parameters to receive, demodulate and/or decode corresponding xPDCCHs, according to some embodiments. With reference to FIG. 8, methods that may relate to UE 830 and hardware processing circuitry 840 are discussed below. Although the actions in the method 1150 are shown in a particular order, the order of the actions can be modified. Thus, the illustrated embodiments can be performed in a different order, and some actions may be performed in parallel. Some of the actions and/or operations listed in FIG. 11B are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 830 and/or hardware processing circuitry 840 to perform an operation comprising the method 1150 of FIG. 11B. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the method of FIG. 11B.

Returning to FIG. 11B, the method 1150 may be in accordance with the various embodiments discussed herein. The method 1150 may comprise, at 1154, processing a parameter set received from the eNB, the parameter set to define Cross Link Physical Downlink Control Channel (xPDCCH). The method 1150 may comprise, at 1158, processing one or more xPDCCH messages in accordance with the parameter set.

In some embodiments, the method may also comprise processing a parameter set received from the eNB, the parameter set to define 5G Physical Downlink Control Channel (xPDCCH); and processing one or more xPDCCH messages in accordance with the parameter set. In some embodiments, the parameter set comprises at least a first parameter received via a first message and a second parameter received via a second message, and wherein to process the parameter set, the method may comprise: processing the first message that is received via broadcast signaling, the broadcast signaling transmitted to a plurality of UEs; and processing the second message that is received via unicast signaling. In some embodiments, to process the parameter set, the method may comprise processing one or more parameters that are to identify a size of a Resource Block Group (RBG) within individual subframes, the RBG associated with the xPDCCH. In some embodiments, to process the parameter set, the method may comprise processing one or more parameters that are to identify a mapping between 5G Control Channel Elements (xCCEs) and Resource Block Groups (RBGs) of one or more xPDCCHs. In some embodiments, to process the parameter set, the method may comprise processing one or more parameters that are to identify one or more types of search spaces for Resource Block Groups (RBGs) of one or more xPDCCHs. In some embodiments, to process the parameter set, the method may comprise processing one or more parameters that are to identify a mapping between Demodulation Reference Signals (DMRS) of one or more xPDCCHs and one or more antenna ports of the apparatus. In some embodiments, to process the parameter set, the method may comprise processing one or more parameters that are to map a Resource Block Group (RBG) to a set of contiguous physical Resource Elements (REs) comprising Demodulation Reference Signals (DMRS) and control channel data.

Figure 12:
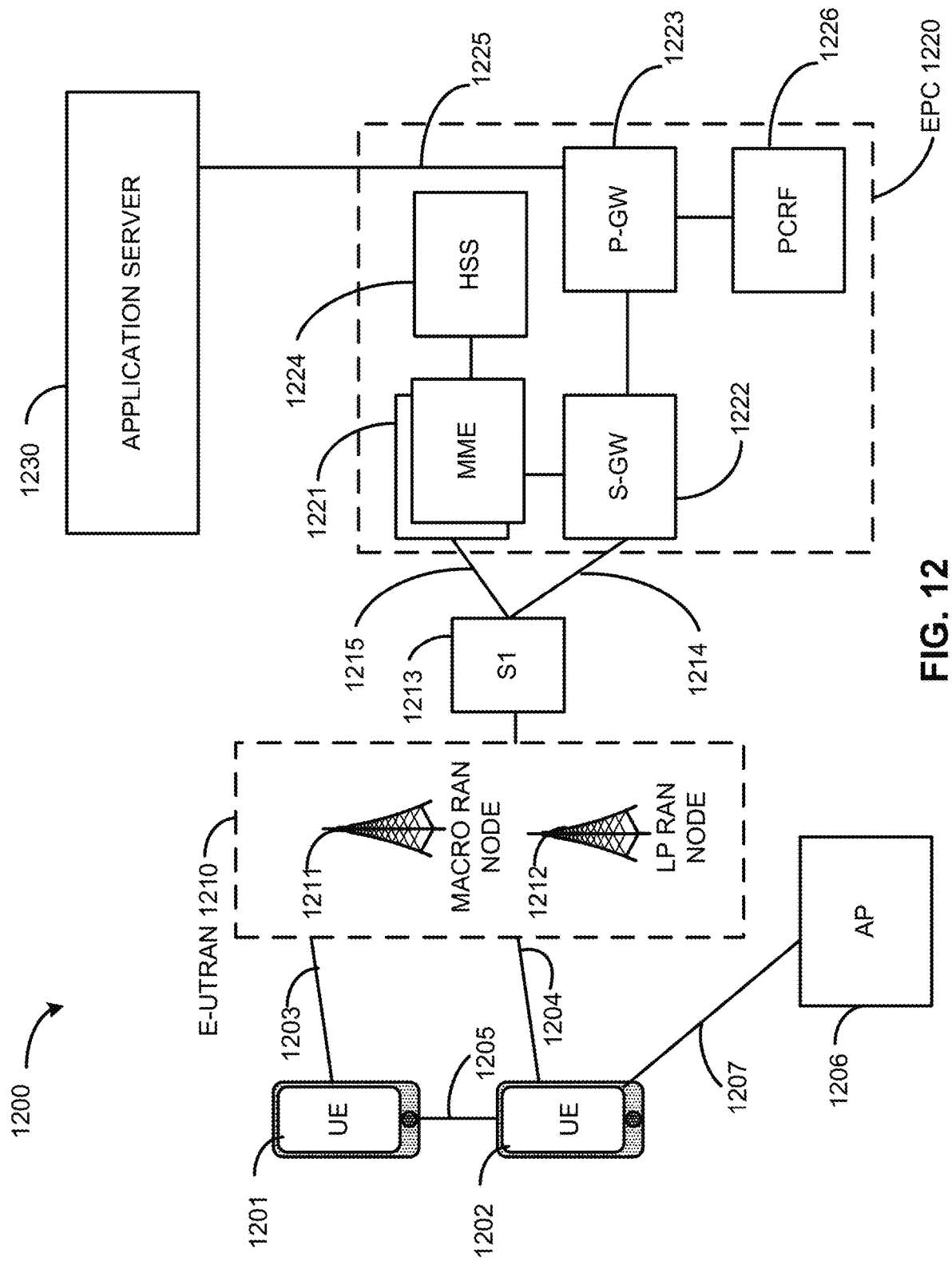
FIG. 12 illustrates an architecture of a system of a network, according to some embodiments.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may be configured to connect, e.g., communicatively couple, with a radio access network (RAN)—in this embodiment, an Evolved Universal Mobile Telecommunications System (UMTS) Terrestrial Radio Access Network (E-UTRAN) 1210. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.11 protocol, wherein the AP 1206 would comprise a wireless fidelity (WiFi®) router. In this example, the AP 1206 is shown to be connected to the Internet without connecting to the core network of the wireless system (described in further detail below).

The E-UTRAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The E-UTRAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the E-UTRAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The E-UTRAN 1210 is shown to be communicatively coupled to a core network—in this embodiment, an Evolved Packet Core (EPC) network 1220 via an S1 interface 1213. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the EPC network 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The EPC network 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the E-UTRAN 1210, and routes data packets between the E-UTRAN 1210 and the EPC network 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the EPC network 1220.

The P-GW 1223 may further be a node for policy enforcement and charging data collection. Policy and Charging Enforcement Function (PCRF) 1226 is the policy and charging control element of the EPC network 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
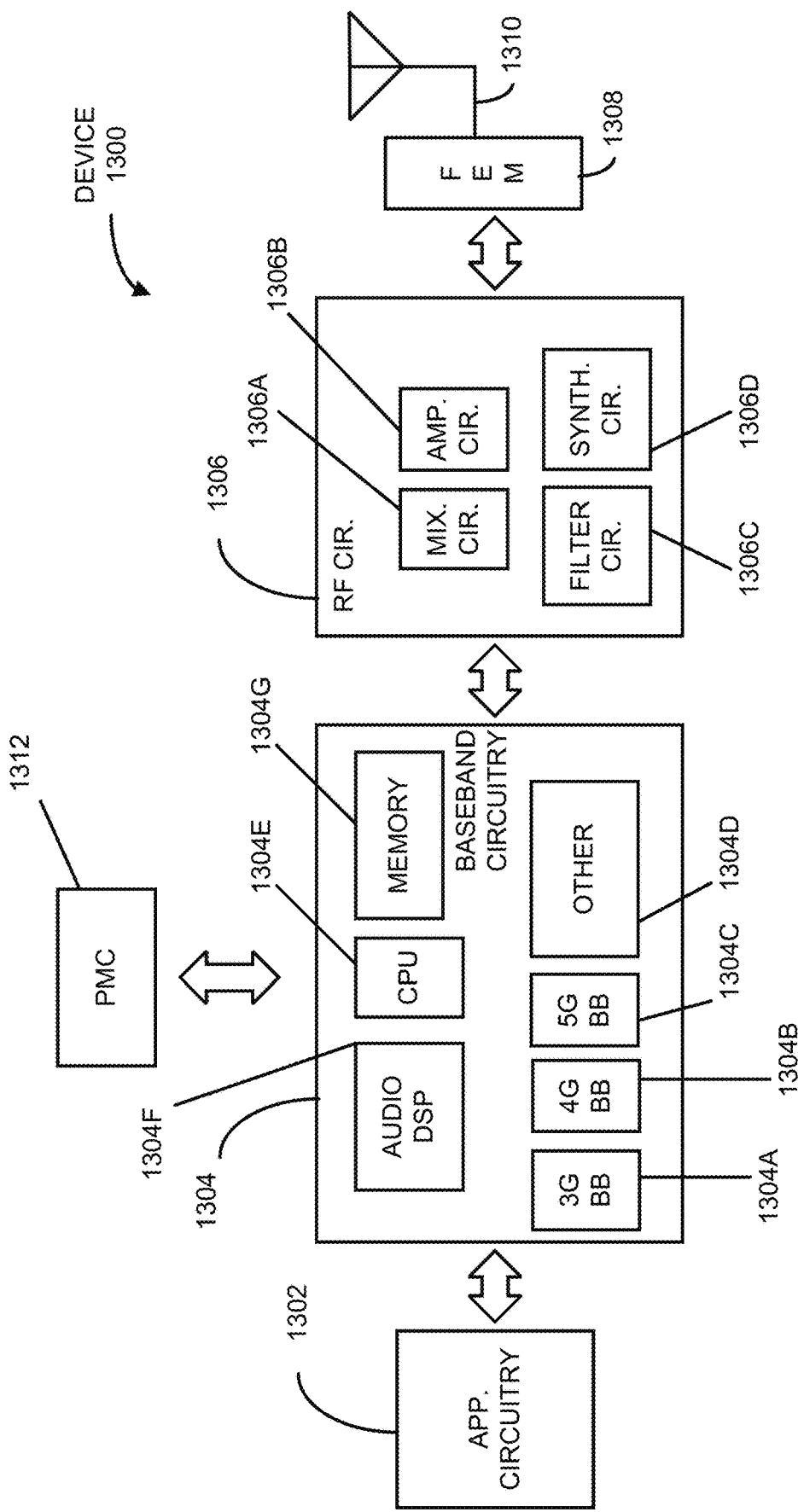
FIG. 13 illustrates example components of a device, according to some embodiments.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 13 12 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
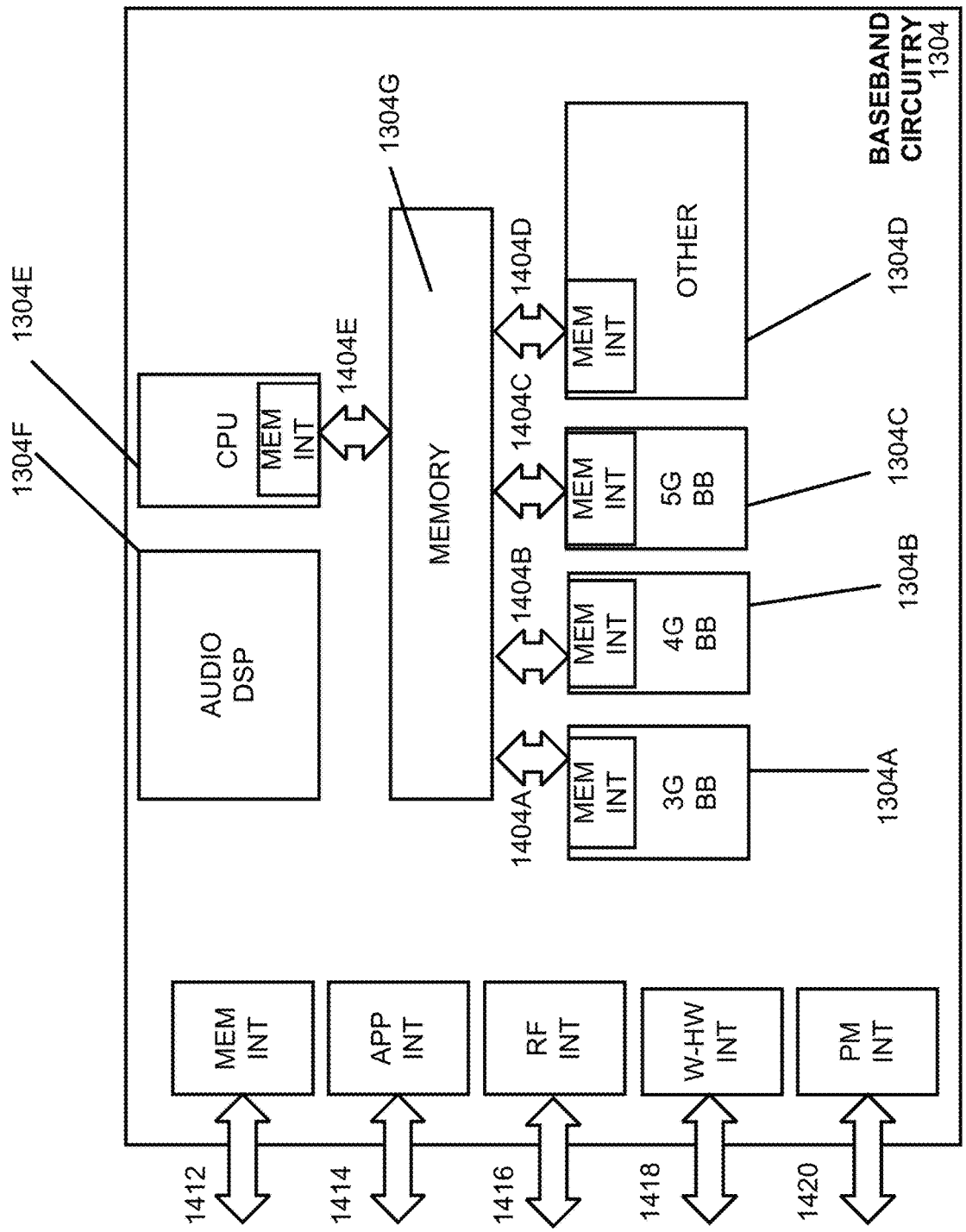
FIG. 14 illustrates example interfaces of baseband circuitry, according to some embodiments.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus of an Evolved Node B (eNB) operable to communicate with a User Equipment (UE) on a wireless network, comprising: one or more processors to: establish a parameter set defining 5G Physical Downlink Control Channel (xPDCCH) transmission to the UE, and generate, for transmission to the UE, one or more messages including the parameter set; and an interface to output the one or more messages including the parameter set to a transceiver circuitry, for transmission to the UE.

Example 2

The apparatus of example 1 or any other example, wherein the one or more processors are to: generate, for transmission to the UE, an xPDCCH in accordance with the parameter set.

Example 3

The apparatus of example 1 or any other example, wherein the one or more messages comprise a first message including a first parameter of the parameter set and a second message including a second parameter of the parameter set, and wherein to generate the one or more messages, the one or more processors are to: generate the first message for transmission via broadcast signaling to a plurality of UEs, including the UE; and generate the second message for transmission via unicast signaling specifically to the UE.

Example 4

The apparatus of any of examples 1-3 or any other example, wherein to establish the parameter set, the one or more processors are to: establish one or more parameters that identify a size of a Resource Block Group (RBG) within individual subframes, the RBG being associated with xPDCCH transmission; and include, within the parameter set, the one or more parameters.

Example 5

The apparatus of example 4 or any other example, wherein the size of the RBG is measured in terms of a first number of consecutive symbols and a second number of consecutive Physical Resource Blocks (PRBs).

Example 6

The apparatus of example 4 or any other example, wherein the RBG is a first RBG, the size is a first size, and wherein the one or more parameters are to identify: the first size of the first RBG, a second size of a second RBG, and locations of the first RBG of the first size and the second RBG of the second size within a subframe, wherein the first RBG and the second RBG are to be located in a single subframe, and wherein the second size is different from the first size.

Example 7

The apparatus of any of examples 1-3 or any other example, wherein to establish the parameter set, the one or more processors are to: establish one or more parameters that identify a logical-to-physical mapping for a set of Resource Block Groups (RBGs) of one or more xPDCCH transmissions; and include, within the parameter set, the one or more parameters for transmission to the UE.

Example 8

The apparatus of example 7 or any other example, wherein the logical-to-physical mapping for the set of Resource Block Groups (RBGs) is in accordance with at least one of: a time-first mapping, a frequency-first mapping, or a combination of time-first and frequency-first mapping.

Example 9

The apparatus of any of examples 1-3 or any other example, wherein to establish the parameter set, the one or more processors are to: establish one or more parameters that identify a mapping between 5G Control Channel Elements (xCCEs) and Resource Block Groups (RBGs) of one or more xPDCCH transmissions; and include, within the parameter set, the one or more parameters.

Example 10

The apparatus of any of examples 1-3 or any other example, wherein to establish the parameter set, the one or more processors are to: establish one or more parameters that identify one or more types of search spaces for Resource Block Groups (RBGs) of one or more xPDCCH transmissions; and include, within the parameter set, the one or more parameters.

Example 11

The apparatus of any of examples 1-3 or any other example, wherein to establish the parameter set, the one or more processors are to: establish one or more parameters that identify a mapping between Demodulation Reference Signals (DMRSes) of one or more xPDCCH transmissions and one or more antenna ports of the apparatus; and include, within the parameter set, the one or more parameters.

Example 12

The apparatus of example 11 or any other example, wherein the one or more antenna ports comprise two antenna ports, and the one or more processors are to: initiate one or more xPDCCH transmissions to the UE in accordance with a Space Frequency Block Code (SFBC) transmission scheme.

Example 13

The apparatus of example 11 or any other example, wherein the one or more antenna ports comprise a first antenna port, and the one or more processors are to: initiate of one or more xPDCCH transmissions to the UE in accordance with single layer beamforming.

Example 14

The apparatus of any of examples 1-3 or any other example, wherein to establish the parameter set, the one or more processors are to: establish one or more parameters that map a Resource Block Group (RBG) to a set of contiguous physical Resource Elements (REs) comprising Demodulation Reference Signals (DMRS) and control channel data; and include, within the parameter set, the one or more parameters.

Example 15

An Evolved Node B (eNB) device comprising an application processor, a memory, one or more antenna ports, and an interface for allowing the application processor to communicate with another device, the eNB device including the apparatus of any of examples 1-14.

Example 16

Machine readable storage media having machine executable instructions that, when executed, cause one or more processors of an Evolved Node B (eNB) to perform an operation comprising: establish a parameter set defining 5G Physical Downlink Control Channel (xPDCCH) transmission to the UE; and generate, for transmission to the UE, one or more messages including the parameter set.

Example 17

The machine readable storage media of example 16 or any other example, wherein the operation comprises: generate, for transmission to the UE, an xPDCCH in accordance with the parameter set.

Example 18

The machine readable storage media of example 16, wherein the one or more messages comprise a first message including a first parameter of the parameter set and a second message including a second parameter of the parameter set, and wherein to generate the one or more messages, the operation comprises: generate the first message for transmission via broadcast signaling to a plurality of UEs, including the UE; and generate the second message for transmission via unicast signaling specifically to the UE.

Example 19

The machine readable storage media of any of examples 16-18 or any other example, wherein to establish the parameter set, the operation comprises: establish one or more parameters to identify a size of a Resource Block Group (RBG) within individual subframes, the RBG being associated with xPDCCH transmission; and include, within the parameter set, the one or more parameters.

Example 20

The machine readable storage media of example 19 or any other example, wherein the size of the RBG is measured in terms of a first number of consecutive symbols and a second number of consecutive Physical Resource Blocks (PRBs).

Example 21

The machine readable storage media of example 19 or any other example, wherein the RBG is a first RBG, the size is a first size, and wherein the one or more parameters are to identify: the first size of the first RBG, a second size of a second RBG, and locations of the first RBG of the first size and the second RBG of the second size within a subframe, wherein the first RBG and the second RBG are to be located in a single subframe, and wherein the second size is different from the first size.

Example 22

The machine readable storage media of any of examples 16-18 or any other example, wherein to establish the parameter set, the operation comprises: establish one or more parameters that identify a logical-to-physical mapping for a set of Resource Block Groups (RBGs) of one or more xPDCCH transmissions; and include, within the parameter set, the one or more parameters for transmission to the UE.

Example 23

The machine readable storage media of example 22 or any other example, wherein the logical-to-physical mapping for the set of Resource Block Groups (RBGs) is in accordance with at least one of: a time-first mapping, a frequency-first mapping, or a combination of a time-first and frequency-first mapping.

Example 24

The machine readable storage media of any of examples 16-18 or any other example, wherein to establish the parameter set, the operation comprises: establish one or more parameters that identify a mapping between 5G Control Channel Elements (xCCEs) and Resource Block Groups (RBGs) of one or more xPDCCHs; and include, within the parameter set, the one or more parameters for transmission.

Example 25

The machine readable storage media of any of examples 16-18 or any other example, wherein to establish the parameter set, the operation comprises: establish one or more parameters that identify one or more types of search spaces for Resource Block Groups (RBGs) of one or more xPDCCH transmissions; and include, within the parameter set, the one or more parameters.

Example 26

The machine readable storage media of any of examples 16-18 or any other example, wherein to establish the parameter set, the operation comprises: establish one or more parameters that identify a mapping between Demodulation Reference Signals (DMRSes) of one or more xPDCCH transmissions and one or more antenna ports of the apparatus; and include, within the parameter set, the one or more parameters.

Example 27

The machine readable storage media of example 26 or any other example, wherein the one or more antenna ports comprise two antenna ports, and wherein the operation comprises: initiate one or more xPDCCH transmissions to the UE in accordance with the Space Frequency Block Code (SFBC) transmission scheme.

Example 28

The machine readable storage media of example 26 or any other example, wherein the one or more antenna ports comprise a first antenna port, and wherein the operation comprises: initiate one or more xPDCCH transmissions to the UE in accordance with single layer beamforming.

Example 29

The machine readable storage media of any of examples 16-18 or any other example, wherein to establish the parameter set, the operation comprises: establish one or more parameters that map a Resource Block Group (RBG) to a set of contiguous physical Resource Elements (REs) comprising Demodulation Reference Signals (DMRSes) and control channel data; and include, within the parameter set, the one or more parameters.

Example 30

An apparatus of a User Equipment (UE) operable to communicate with an Evolved Node B (eNB) on a wireless network, comprising: one or more processors to: process a parameter set received from the eNB, the parameter set defining 5G Physical Downlink Control Channel (xPDCCH) transmission from the eNB, and process one or more xPDCCH messages in accordance with the parameter set; and a memory to store at least a part of the parameter set.

Example 31

The apparatus of example 30 or any other example, wherein the parameter set comprises at least a first parameter received via a first message and a second parameter received via a second message, and wherein to process the parameter set, the one or more processors are to: process the first message that is received via broadcast signaling to a plurality of UEs, including the UE; and process the second message that is received via unicast signaling specifically to the UE.

Example 32

The apparatus of any of examples 30-31 or any other example, wherein to process the parameter set, the one or more processors are to: process one or more parameters that identify a size of a Resource Block Group (RBG) within individual subframes, the RBG being associated with xPDCCH transmission.

Example 33

The apparatus of any of examples 30-31 or any other example, wherein to process the parameter set, the one or more processors are to: process one or more parameters that identify a mapping between 5G Control Channel Elements (xCCEs) and Resource Block Groups (RBGs) of one or more xPDCCH transmissions.

Example 34

The apparatus of any of examples 30-31 or any other example, wherein to process the parameter set, the one or more processors are to: process one or more parameters that identify one or more types of search spaces for Resource Block Groups (RBGs) of one or more xPDCCH transmissions.

Example 35

The apparatus of any of examples 30-31 or any other example, wherein to process the parameter set, the one or more processors are to: process one or more parameters that identify a mapping between Demodulation Reference Signals (DMRSes) of one or more xPDCCH transmissions and one or more antenna ports of the apparatus.

Example 36

The apparatus of any of examples 30-31 or any other example, wherein to process the parameter set, the one or more processors are to: process one or more parameters that map a Resource Block Group (RBG) to a set of contiguous physical Resource Elements (REs) comprising Demodulation Reference Signals (DMRSes) and control channel data.

Example 37

The apparatus of any of examples 30-36 or any other example, further comprising: a transceiver circuitry for generating transmissions and processing transmissions.

Example 38

A User Equipment (UE) device comprising an application processor, a memory, one or more antennas, a wireless interface for allowing the application processor to communicate with another device, and a touch-screen display, the UE device including the apparatus of any of examples 30-37 or any other example.

Example 39

Machine readable storage media having machine executable instructions that, when executed, cause one or more processors of a User Equipment (UE) to perform an operation comprising: process a parameter set received from the eNB, the parameter set defining 5G Physical Downlink Control Channel (xPDCCH) transmission from the eNB; and process one or more xPDCCH messages in accordance with the parameter set Example 40

The machine readable storage media of example 30 or any other example, wherein the parameter set comprises at least a first parameter received via a first message and a second parameter received via a second message, and wherein to process the parameter set, the operation comprises: process the first message that is received via broadcast signaling to a plurality of UEs, including the UE; and process the second message that is received via unicast signaling specifically to the UE.

Example 41

The machine readable storage media of any of examples 39-40 or any other example, wherein to process the parameter set, the operation comprises: process one or more parameters that identify a size of a Resource Block Group (RBG) within individual subframes, the RBG being associated with xPDCCH transmissions.

Example 42

The machine readable storage media of any of examples 39-40 or any other example, wherein to process the parameter set, the operation comprises: process one or more parameters that identify a mapping between 5G Control Channel Elements (xCCEs) and Resource Block Groups (RBGs) of one or more xPDCCH transmissions.

Example 43

The machine readable storage media of any of examples 39-40 or any other example, wherein to process the parameter set, the operation comprises: process one or more parameters that identify one or more types of search spaces for Resource Block Groups (RBGs) of one or more xPDCCH transmissions.

Example 44

The machine readable storage media of any of examples 39-40 or any other example, wherein to process the parameter set, the operation comprises: process one or more parameters that identify a mapping between Demodulation Reference Signals (DMRS) of one or more xPDCCH transmissions and one or more antenna ports of the apparatus.

Example 45

The machine readable storage media of any of examples 39-40 or any other example, wherein to process the parameter set, the operation comprises: process one or more parameters that map a Resource Block Group (RBG) to a set of contiguous physical Resource Elements (REs) comprising Demodulation Reference Signals (DMRSes) and control channel data.

Example 46

A method at an Evolved Node B (eNB), the method comprising: establishing a parameter set defining 5G Physical Downlink Control Channel (xPDCCH) transmission to the UE; and generating, for transmission to the UE, one or more messages including the parameter set Example 47

The method of example 46 or any other example, further comprising: generating, for transmission to the UE, an xPDCCH in accordance with the parameter set.

Example 48

The method of example 46 or any other example, wherein the one or more messages comprise a first message including a first parameter of the parameter set and a second message including a second parameter of the parameter set, and wherein generating the one or more messages comprises: generating the first message for transmission via broadcast signaling to a plurality of UEs, including the UE; and generating the second message for transmission via unicast signaling specifically to the UE.

Example 49

The method of any of examples 46-48 or any other example, wherein establishing the parameter set comprises: establishing one or more parameters to identify a size of a Resource Block Group (RBG) within individual subframes, the RBG being associated with xPDCCH transmission; and including, within the parameter set, the one or more parameters.

Example 50

The method of example 49 or any other example, wherein the size of the RBG is measured in terms of a first number of consecutive symbols and a second number of consecutive Physical Resource Blocks (PRBs).

Example 51

The method of any of examples 46-48 or any other example, wherein establishing the parameter set comprises: establishing one or more parameters that map a Resource Block Group (RBG) to a set of contiguous physical Resource Elements (REs) comprising Demodulation Reference Signals (DMRSes) and control channel data; and including, within the parameter set, the one or more parameters.

Example 52

One or more non-transitory computer-readable storage media to store instructions that, when executed by a processor, cause the processor to execute a method of any of the examples 46-51.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A base station apparatus operable to communicate with a User Equipment (UE) on a wireless network, comprising:
   one or more processors to:
     establish a parameter set defining 5G Physical Downlink Control Channel (xPDCCH) transmission to the UE, wherein the parameter set includes:
       first one or more parameters to identify a size of a Resource Block Group (RBG) within individual subframes, the RBG being associated with the xPDCCH transmission, wherein the size of the RBG is measured in terms of a first number of consecutive symbols and a second number of consecutive Physical Resource Blocks (PRBs); and
       second one or more parameters that map the Resource Block Group (RBG) to a set of contiguous physical Resource Elements (REs) comprising Demodulation Reference Signals (DMRSes) and control channel data; and
     generate, for transmission to the UE, one or more messages including the parameter set; and
   an interface to output the one or more messages including the parameter set to a transceiver circuitry, for transmission to the UE.

2. The base station apparatus of claim 1, wherein the one or more processors are to:
   generate, for transmission to the UE, the xPDCCH in accordance with the parameter set.

3. The base station apparatus of claim 1, wherein the one or more messages comprise a first message including a first parameter of the parameter set and a second message including a second parameter of the parameter set, and wherein to generate the one or more messages, the one or more processors are to:
generate the first message for transmission via broadcast signaling to a plurality of UEs, including the UE; and
generate the second message for transmission via unicast signaling specifically to the UE.

4. The base station apparatus of claim 1, wherein the RBG is a first RBG, the size is a first size, and wherein the first and second one or more parameters are to identify:
the first size of the first RBG, a second size of a second RBG, and locations of the first RBG of the first size and the second RBG of the second size within a subframe,
wherein the first RBG and the second RBG are to be located in a single subframe, and
wherein the second size is different from the first size.

5. The base station apparatus of claim 1, wherein to establish the parameter set, the one or more processors are to:
establish one or more parameters that identify a logical-to-physical mapping for a set of Resource Block Groups (RBGs) of one or more xPDCCH transmissions; and
include, within the parameter set, the one or more parameters for transmission to the UE.

6. The base station apparatus of claim 5, wherein the logical-to-physical mapping for the set of Resource Block Groups (RBGs) is in accordance with at least one of: a time-first mapping, a frequency-first mapping, or a combination of time-first and frequency-first mapping.

7. The base station apparatus of claim 1, wherein to establish the parameter set, the one or more processors are to:
establish one or more parameters that identify a mapping between 5G Control Channel Elements (xCCEs) and Resource Block Groups (RBGs) of one or more xPDCCH transmissions; and
include, within the parameter set, the one or more parameters.

8. The base station apparatus of claim 1, wherein to establish the parameter set, the one or more processors are to:
establish one or more parameters that identify one or more types of search spaces for Resource Block Groups (RBGs) of one or more xPDCCH transmissions; and
include, within the parameter set, the one or more parameters.

9. The base station apparatus of claim 1, wherein to establish the parameter set, the one or more processors are to:
establish one or more parameters that identify a mapping between Demodulation Reference Signals (DMRSes) of one or more xPDCCH transmissions and one or more antenna ports of the apparatus; and
include, within the parameter set, the one or more parameters.

10. The base station apparatus of claim 9, wherein the one or more antenna ports comprise two antenna ports, and the one or more processors are to:
initiate one or more xPDCCH transmissions to the UE in accordance with a Space Frequency Block Code (SFBC) transmission scheme.

11. The base station apparatus of claim 9, wherein the one or more antenna ports comprise a first antenna port, and the one or more processors are to:
initiate one or more xPDCCH transmissions to the UE in accordance with single layer beamforming.

12. The base station apparatus of claim 1, wherein to establish the parameter set, the one or more processors are to:
establish one or more parameters that map a Resource Block Group (RBG) to a set of contiguous physical Resource Elements (REs) comprising Demodulation Reference Signals (DMRS) and control channel data; and
include, within the parameter set, the one or more parameters.

13. Machine readable storage media having machine executable instructions that, when executed, cause one or more processors of a base station to perform an operation comprising:
establishing a parameter set defining 5G Physical Downlink Control Channel (xPDCCH) transmission to a User Equipment (UE), wherein the parameter set includes:
first one or more parameters to identify a size of a Resource Block Group (RBG) within individual subframes, the RBG being associated with the xPDCCH transmission, wherein the size of the RBG is measured in terms of a first number of consecutive symbols and a second number of consecutive Physical Resource Blocks (PRBs); and
second one or more parameters that map the Resource Block Group (RBG) to a set of contiguous physical Resource Elements (REs) comprising Demodulation Reference Signals (DMRSes) and control channel data; and
generating, for transmission to the UE, one or more messages including the parameter set.

14. The machine readable storage media of claim 13, wherein the one or more messages comprise a first message including a first parameter of the parameter set and a second message including a second parameter of the parameter set, and wherein to generate the one or more messages, the operation comprises:
generating the first message for transmission via broadcast signaling to a plurality of UEs, including the UE;
generating the second message for transmission via unicast signaling specifically to the UE; and
generating, for transmission to the UE, an xPDCCH in accordance with the parameter set.

15. A User Equipment (UE) operable to communicate with a base station on a wireless network, comprising:
one or more processors to:
process a parameter set received from a base station (BS), the parameter set defining 5G Physical Downlink Control Channel (xPDCCH) transmission from the base station, wherein the parameter set includes:
first one or more parameters to identify a size of a Resource Block Group (RBG) within individual subframes, the RBG being associated with the xPDCCH transmission, wherein the size of the RBG is measured in terms of a first number of consecutive symbols and a second number of consecutive Physical Resource Blocks (PRBs); and
second one or more parameters that map the Resource Block Group (RBG) to a set of contiguous physical Resource Elements (REs) comprising Demodulation Reference Signals (DMRSes) and control channel data; and process one or more xPDCCH messages in accordance with the parameter set; and a memory to store at least a part of the parameter set.

16. The UE of claim 15, wherein the parameter set comprises at least a first parameter received via a first message and a second parameter received via a second message, and wherein to process the parameter set, the one or more processors are to:

process the first message that is received via broadcast signaling to a plurality of UEs, including the UE; and process the second message that is received via unicast signaling specifically to the UE.

17. The UE of claim 15, wherein to process the parameter set, the one or more processors are to:

process the first one or more parameters that identify the size of a Resource Block Group (RBG) within individual subframes, the RBG being associated with the xPDCCH transmission.

* * * * *